(12) United States Patent
Ishihara

(10) Patent No.: US 8,679,413 B2
(45) Date of Patent: *Mar. 25, 2014

(54) HONEYCOMB STRUCTURAL BODY AND ELECTRICAL HEATED CATALYST DEVICE

(75) Inventor: Mikio Ishihara, Anjo (JP)

(73) Assignee: Denso Corporation, Kariya (JP)

( * ) Notice: Subject to any disclaimer, the term of this patent is extended or adjusted under 35 U.S.C. 154(b) by 238 days.

This patent is subject to a terminal disclaimer.

(21) Appl. No.: 13/238,472

(22) Filed: Sep. 21, 2011

(65) Prior Publication Data

US 2012/0076699 A1    Mar. 29, 2012

(30) Foreign Application Priority Data

Sep. 27, 2010 (JP) ................................. 2010-215963
May 30, 2011 (JP) ................................. 2011-120958

(51) Int. Cl.
*F01N 3/10* (2006.01)

(52) U.S. Cl.
USPC ......................................................... 422/174

(58) Field of Classification Search
USPC .......................................... 422/174, 179, 180
See application file for complete search history.

(56) References Cited

U.S. PATENT DOCUMENTS

| 5,200,154 | A | 4/1993 | Harada et al. |
| 5,245,825 | A | 9/1993 | Ohhashi et al. |
| 5,446,264 | A | 8/1995 | Kondo et al. |
| 5,670,746 | A * | 9/1997 | Hashimoto et al. ........... 174/651 |
| 5,680,503 | A | 10/1997 | Abe et al. |
| 2013/0045137 | A1* | 2/2013 | Sakashita et al. ............. 422/174 |

FOREIGN PATENT DOCUMENTS

| JP | 4-067588 | 3/1992 |
| JP | 4-280086 | 10/1992 |
| JP | 4-280087 | 10/1992 |
| JP | 7-166845 | 6/1995 |
| JP | 2010-106735 | 5/2010 |
| WO | WO 2011125816 A1 * | 10/2011 |

* cited by examiner

*Primary Examiner* — Tom Duong
(74) *Attorney, Agent, or Firm* — Nixon & Vanderhye P.C.

(57) ABSTRACT

A honeycomb structural body has a honeycomb body and an electrode pair. The honeycomb body has a cell formation part and an outer skin part of a cylindrical-hollow shape. The electrodes are formed on an outer peripheral surface of the outer skin part so that the electrodes face to each other in a diameter direction of the honeycomb body. Each electrode has a reference electrode part formed at a central part of the electrode and one or more outside electrode parts formed at both ends of the reference electrode part. An electrode terminal is formed at the central part of each electrode. The reference electrode parts of the electrodes face to each other. The outside electrode parts of the electrodes face to each other. A thickness of each electrode is gradually decreased from the central part toward the outside of the electrode along the circumferential direction of the honeycomb body.

7 Claims, 12 Drawing Sheets

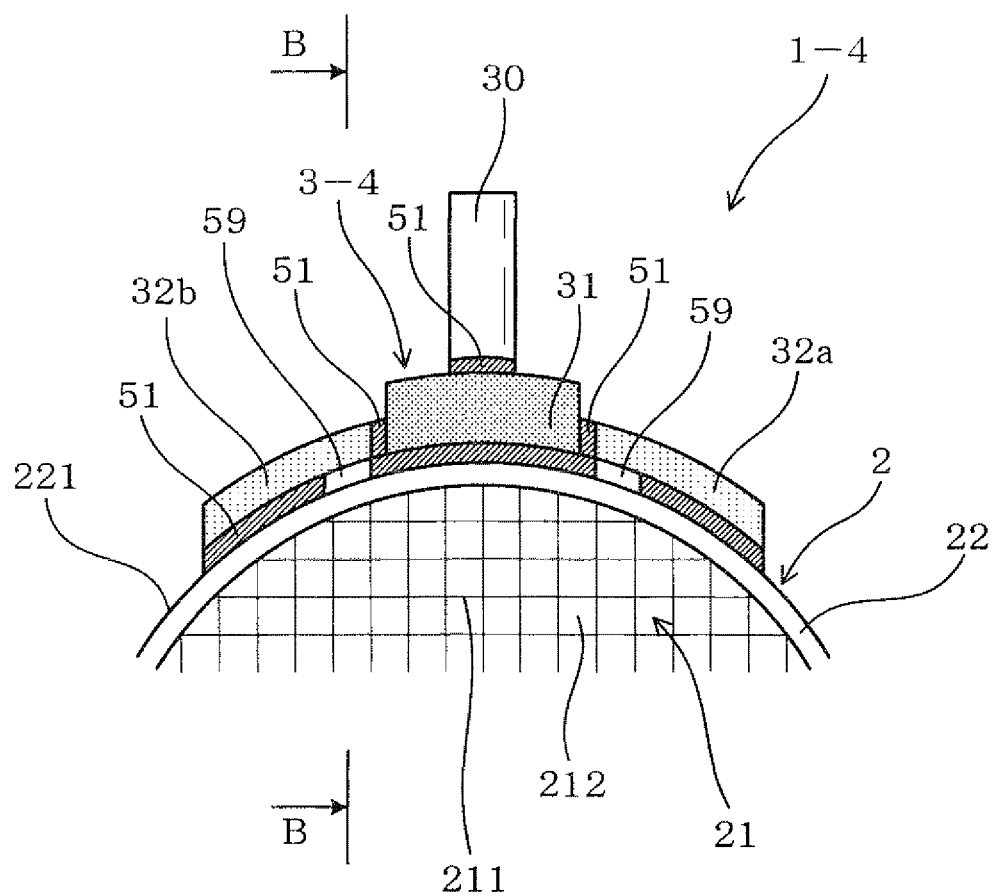

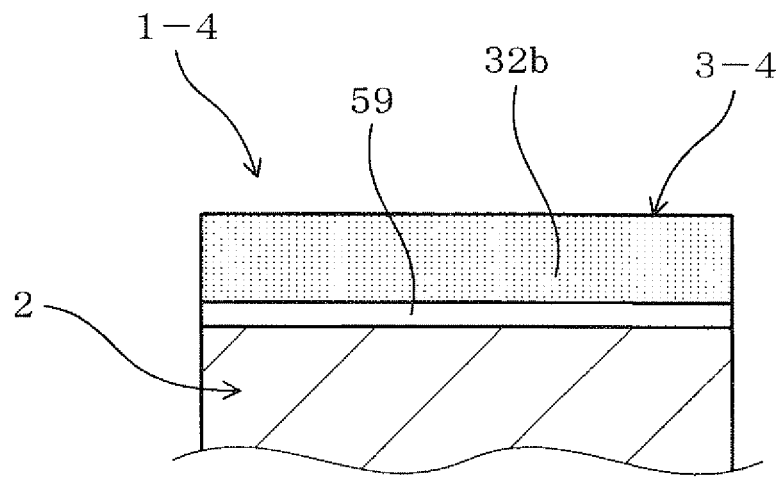
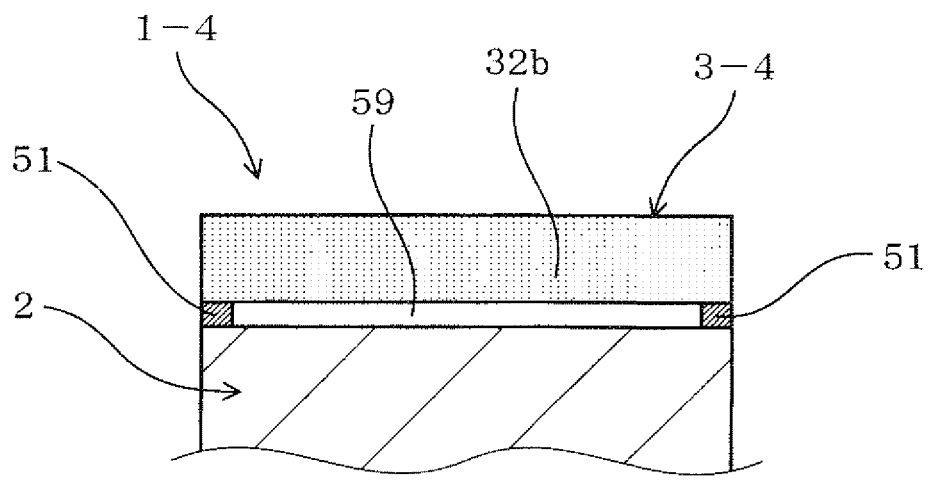

HONEYCOMB STRUCTURAL BODY AND ELECTRICAL HEATED CATALYST DEVICE

CROSS-REFERENCE TO RELATED APPLICATION

This application is related to and claims priority from Japanese Patent Applications No. 2010-215963 filed on Sep. 27, 2010, and No. 2011-120958 filed on May 30, 2011, the contents of which are hereby incorporated by reference.

BACKGROUND OF THE INVENTION

1. Field of the Invention

The present invention relates to honeycomb structural bodies to be used for purifying exhaust gas emitted from an internal combustion engines, and electrically heated catalyst (EHC) devices equipped with the honeycomb structural body.

2. Description of the Related Art

In general, a catalyst device is mounted to an exhaust gas pipe of an exhaust gas purifying system through which exhaust gas emitted from an internal combustion engine of a motor vehicle flows and purified. The catalyst device is capable of purifying exhaust gas. In general, such a catalyst device uses a honeycomb structural body which supports catalyst such as platinum (Pt), palladium (Pd), rhodium (Rh), etc., therein.

By the way, it is necessary to heat the catalyst supported in the catalyst device at approximately 400° C. in order to adequately activate the catalyst. In order to achieve this, there is a conventional technique, an electrically heated catalyst (EHC) device having a honeycomb structural body equipped with a pair of a positive electrode and a negative electrode. The positive and negative electrodes are formed on the outer peripheral surface of the honeycomb structural body. When electrical power is supplied to the positive and negative electrodes, current flows in the honeycomb structural body, and heat energy is generated in the honeycomb structural body.

For example, Japanese patent laid open publication No. 2010-106735 has disclosed a honeycomb structural body having a cylindrical shape on which a pair of a positive electrode and a negative electrode is formed on the outer circumferential surface thereof. When a honeycomb structural body has a cylindrical shape (namely, whose cross section perpendicular to an axial direction of the honeycomb structural body has a circular shape), a distance between the positive electrode and the negative electrode forming the electrode pair is changed according to a portion of the electrodes, namely, not constant. This electrode structure causes a problem of it being difficult for the current to flow through a long distance between the electrode pair (for example, a distance at the central parts between the positive electrode and the negative electrode) when compared with the current flowing through a short distance at the end parts between the positive electrode and the negative electrode (for example, a distance at the outside portion between the positive electrode and the negative electrode). This causes non-uniform temperature distribution in the inside of the honeycomb structural body because of causing unbalanced temperature distribution in the inside of the honeycomb structural body.

In order to solve the above conventional problem, there is a conventional technique, disclosed in Japanese patent laid open publication No. H04-67588. This conventional technique provides a honeycomb structural body of a cylindrical shape having a heater part and a slit part. The slit part is formed in the honeycomb structural body and adjusts the electrical resistance in the honeycomb structural body.

Further, there is other conventional technique, disclosed in Japanese patent laid open publication No. H04-280086, which provides a honeycomb structural body equipped with a honeycomb monolith heater. In particular, a cross section of the honeycomb structural body, which is perpendicular to an axial direction of the honeycomb structural body, has a square shape or a race-track shape in order to have the same distance between the electrode pair.

However, the honeycomb structural body with the electrodes disclosed in Japanese patent laid open publication No. H04-67588 has a long electrical path because of having the slit part in order to adjust the electrical resistance. This structure causes a difficulty of increasing the temperature of the honeycomb structural body as soon as electrical power is supplied.

Further, this conventional honeycomb structural body has a possibility of decreasing the entire strength and the capability of purifying exhaust gas because of having the slit part in the honeycomb structural body.

Because the honeycomb structural body with the honeycomb monolith heater disclosed in Japanese patent laid open publication No. H04-280086 has a square shape or a race-track shape, there is a possibility of it being difficult to mount it in an exhaust gas pipe of a motor vehicle. That is, the structure of this conventional honeycomb structural body has a drawback on mounting it to the exhaust gas pipe in the exhaust gas purifying system for the internal combustion engine of a motor vehicle.

SUMMARY OF THE INVENTION

It is an object of the present invention to provide a honeycomb structural body and an electrically heated catalyst (EHC) device equipped with the honeycomb structural body which is capable of being easy to be mounted to an exhaust gas pipe of an exhaust gas purifying system, and of being increased uniformly to a desired temperature.

To achieve the above purposes, the present exemplary embodiment provides a honeycomb structural body having a honeycomb body, a pair of electrodes and electrode terminals. The honeycomb body has a cell formation part and an outer skin part of a cylindrical shape. The outer skin part covers the cell formation part. The electrode pair is formed on an outer peripheral surface of the outer skin part so that the electrodes face to each other in a diameter direction of the honeycomb body. The electrode terminal is formed on a central part of each of the electrodes. In particular, a thickness of each of the electrodes in the electrode pair is gradually decreased from the central part toward an outside of each of the electrodes along the circumferential direction of the honeycomb body.

In the honeycomb body in the honeycomb structural body having the above improved structure, the cell formation part in the honeycomb body is covered with the outer skin part. A cross section of the honeycomb body, which is perpendicular to an axial direction of the honeycomb body, is a circular shape. Accordingly, the distance between the electrodes facing to each other in the radial direction of the honeycomb body is changed by the portion on the electrode. Specifically, the more the portion apart from the central part of each electrode is increased, the more the distance between the electrodes of the electrode pair is decreased. This means that the more the portion on the electrode apart from the central part of the electrode is increased, the more a current easily flows between the electrodes through the inside of the honeycomb body.

On the basis of the fact that an electrical resistance value is in inverse proportion to a cross sectional area of a conductive member such as electrodes, each of the electrode formed on the outer surface of the outer skin part of the honeycomb body has a structure in which a thickness of each electrode is gradually decreased from its central part toward the outside along the circumferential direction of the honeycomb body. Further, in each of the electrodes, the central part of each electrode, which has the longest distance between the electrodes measured in an axial direction of the honeycomb body, has the minimum electrical resistance value per unit length. Further, the electrical resistance value of the portion of each electrode is gradually increased from the central part to the outside of the electrode according to decreasing of the electrode distance from the central part toward the outside of the electrode along the circumferential direction of the honeycomb body.

As described above, in the honeycomb structural body according to the exemplary embodiment, because the thickness of each of the electrodes in the electrode pair is adjusted according to the electrode distance between the electrodes which face to each other in a radius direction of the honeycomb body, it is possible to suppress the deviation of current flowing in the honeycomb body from a uniform current distribution. This structure of the electrode pair makes it possible for current to flow uniformly in the inside of the honeycomb body.

That is, it is possible for the temperature of the honeycomb body to increase uniformly even if the honeycomb body has a circular shaped cross section which is perpendicular to an axial direction of the honeycomb body. Further, this structure of the electrode pair makes it possible to suppress the deviation from a uniform temperature distribution in the inside of the honeycomb body.

Further, this structure of the electrode pair in the honeycomb structural body makes it possible to suppress and relax the thermal stress generated in the inside of the honeycomb body, and to prevent cracks from being generated in the honeycomb body, and to prevent the honeycomb body from being damaged and broken, Still further, the honeycomb body in the honeycomb structural body according to the exemplary embodiment has a circular shaped cross section which is perpendicular to an axial direction of the honeycomb body. That is, the honeycomb body has a cylindrical shape. This shape makes it possible to easily handle the honeycomb structural body. For example, this structure allows the honeycomb structural body equipped with the honeycomb body to be mounted to an exhaust gas pipe of an exhaust gas purifying system for an internal combustion engine mounted for example to a motor vehicle.

Furthermore, this structure of the honeycomb structural body according to the exemplary embodiment makes it possible to store the honeycomb structural body in the exhaust gas pipe with uniform stress applied from the outer periphery toward the inside of the honeycomb structural body. This makes it possible to suppress cracks from being generated in the honeycomb structural body by vibration and stress. It is therefore possible to easily mount the honeycomb structural body to the exhaust gas purifying system of the motor vehicle.

In accordance with other exemplary embodiment of the present invention, there is provided an electrically heated catalyst (EHC) device having the honeycomb structural body previously described, catalyst supported in the honeycomb body and an electric power supplying device. The electric power supplying device supplies electric power to the electrode pair in the honeycomb structural body in order to heat the honeycomb body.

The electrically heated catalyst (EHC) device is equipped with the honeycomb structural body previously described. When electric power is supplied to the electrode pair formed on the outer circumferential surface of the outer skin part of the honeycomb body, the temperature of the inside of the honeycomb body is increased uniformly. This makes it possible for the catalyst supported in the honeycomb body to activate uniformly with high efficiency, and to purify exhaust gas emitted from the internal combustion engine of the motor vehicle as soon as the electric power is supplied to the honeycomb body.

Accordingly, the exemplary embodiments of the present invention provide the honeycomb structural body and the electrically heated catalyst device. The honeycomb structural body is easy to mount to the exhaust gas purifying system, and the temperature of the honeycomb structural body is increased uniformly.

BRIEF DESCRIPTION OF THE DRAWINGS

A preferred, non-limiting embodiment of the present invention will be described by way of example with reference to the accompanying drawings, in which:

FIG. 9 is a view showing an enlarged cross section of a part around a positive electrode formed on the surface of the honeycomb body in the honeycomb structural body according to a fourth exemplary embodiment of the present invention;

FIG. 10 is a view showing a cross section of the honeycomb structural body along the line B-B shown in FIG. 9;

FIG. 11 is a view showing a cross section of another structure of the honeycomb structural body along the line B-B shown in FIG. 9;

DETAILED DESCRIPTION OF THE PREFERRED EMBODIMENTS

Figure 1:
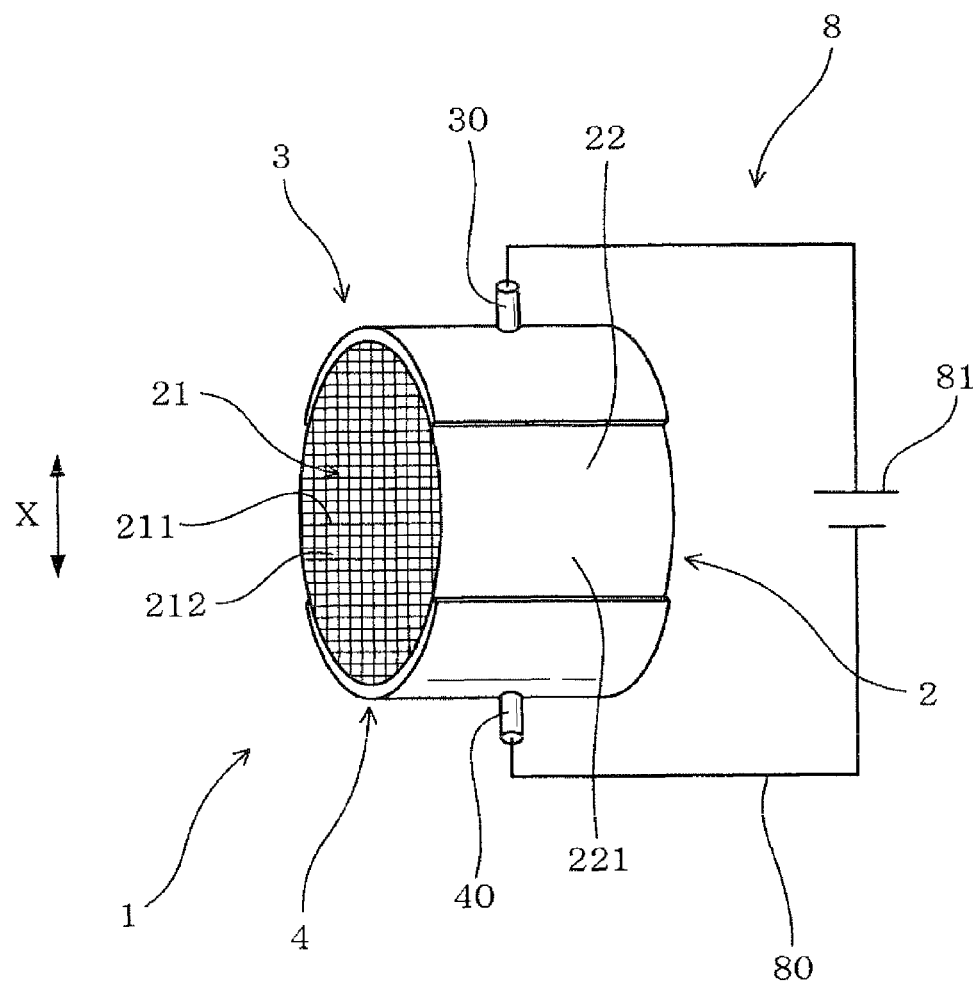
FIG. 1 is a view showing a perspective configuration of a honeycomb structural body according to a first exemplary embodiment of the present invention.

Hereinafter, various embodiments of the present invention will be described with reference to the accompanying drawings. In the following description of the various embodiments, like reference characters or numerals designate like or equivalent component parts throughout the several diagrams.
First Exemplary Embodiment A description will be given of a honeycomb structural body and an electrically heated catalyst (EHC) device, as an electrical heating type, equipped with the honeycomb structural body according to a first exemplary embodiment of the present invention with reference to FIG. 1 and FIG. 2.

Figure 2:
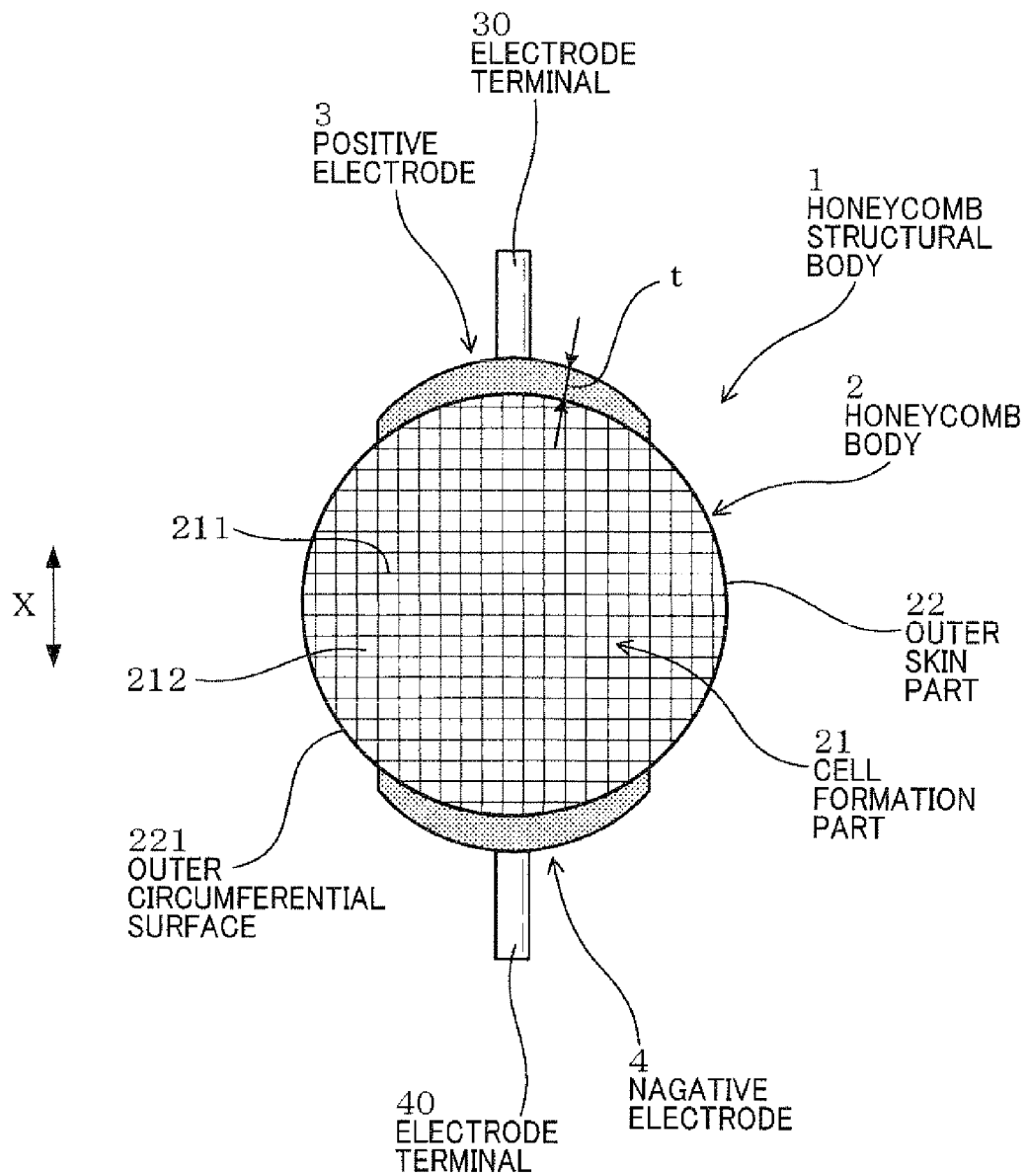
FIG. 2 is a view showing a cross section of a honeycomb structural body, which is perpendicular to an axial direction thereof, according to the first exemplary embodiment of the present invention.

FIG. 1 is a view showing a perspective configuration of the honeycomb structural body 1 according to the first exemplary embodiment of the present invention. FIG. 2 is a view showing a cross section of the honeycomb structural body 1. The cross section shown in FIG. 2 is perpendicular to an axial direction of the honeycomb structural body 1.

As shown in FIG. 1 and FIG. 2, the honeycomb structural body 1 according to the first exemplary embodiment is comprised of a honeycomb body 2 and a pair of a positive electrode 3 and a negative electrode 4. The honeycomb body 2 has a cell formation part 21 and an outer skin part 22 of a cylindrical shape. The cell formation part 21 is covered with the outer skin part 22. The positive electrode 3 and the negative electrode 4 are arranged on the outer circumferential surface 221 of the outer skin part 22 in a radial direction. The positive electrode 3 and the negative electrode 4 are arranged opposite to each other in the radial direction of the honeycomb structural body 1. In particular, as shown in FIG. 2, the thickness "t" of each of the positive electrode 3 and the negative electrode 4 is gradually decreased from the central part to the outside in the circumferential direction of the honeycomb body 2. The central part of each electrode has the maximum thickness.

A description will now be given of the structure of the positive electrode 3 and the negative electrode 4 formed on the circumferential surface of the honeycomb body 2 in detail.

As shown in FIG. 1, the honeycomb body 2 in the honeycomb structural body 1 has a cylindrical shape and is comprised of the cell formation part 21 and the outer skin part 22. The honeycomb body 2 is made of porous ceramics composed of silicon carbide SiC. The electrical resistivity of the honeycomb body 2 is larger than each of the positive electrode 3 and the negative electrode 4. The structure of each of the positive electrode 3 and the negative electrode 4 will be explained later in detail.

The cell formation part 21 is comprised of porous partition walls 211 arranged in a square lattice shape, and a plurality of cells 211. Each cell 212 is formed by the partition walls 211 and extended along an axial direction of the honeycomb body 2. For example, each cell 212 is surrounded by the four partition walls 211 and has a square shaped cross section.

As shown in FIG. 1 and FIG. 2, the pair of the positive electrode 3 and the negative electrode 4. is formed on the outer circumferential surface of the outer skin part 22 so that the positive electrode 3 and the negative electrode 4 face to each other in a radial direction through the honeycomb body 2.

Each of the positive electrode 3 and the negative electrode 4 is formed along the circumferential direction along the outer peripheral surface 221 of the outer skin part 22. Each of the positive electrode 3 and the negative electrode 4 is made of porous ceramics composed of SiC-Si composite.

As shown in FIG. 2, the thickness "t" of the positive electrode 3 is gradually decreased from the central part to the outside thereof along the circumferential direction of the outer skin part 22. In particular, the maximum thickness "t" of the positive electrode 3 is 2 mm, the minimum thickness "t" of the positive electrode 3 is 0.5 mm. The positive electrode terminal 30 is formed on the positive electrode 3 at the central part in the circumferential direction of the positive electrode 3 and at the central part in an axial direction of the honeycomb body 2.

On the other hand, similar to the structure of the positive electrode 3, the thickness "t" of the negative electrode 4 is gradually decreased from the central part to the outside thereof along the circumferential direction of the outer skin part 22. In particular, the negative electrode 4 has the same maximum thickness "t" of 2 mm of the positive electrode 3, and the negative electrode 4 has the same minimum thickness "t" of 0.5 mm of the positive electrode 3.

The negative electrode terminal 40 is formed on the negative electrode 4 at the central part in the circumferential direction of the negative electrode 4 and at the central part in an axial direction of the honeycomb body 2.

As shown in FIG. 1, the electrode terminal 30 of the positive electrode 3 is connected to a positive electrode of an outside power source 81 through an electrical path 80, and the electrode terminal 40 of the positive electrode 4 is connected to a negative electrode of the outside power source 81 through the electrical path 80.

Catalyst is supported on the surface f the partition walls 211 of the cell formation part 21 of the honeycomb body 2. The first exemplary embodiment uses three-way catalyst such as noble metal, for example, platinum (Pt), palladium (Pd), rhodium (Rh), etc.

When the electric power source 81 supplies electric power to the positive electrode 3 and the negative electrode 4 as the electrode pair through the electrical path 80, the honeycomb body 2 is heated. Thus, the honeycomb structural body 1 according to the first exemplary embodiment can be used as an electrical heated catalyst (EHC) device 8.

Next, a description will now be given of the method of producing the honeycomb structural body 1 according to the first exemplary embodiment.

First, porous ceramics composed of silicon carbide SiC, etc. is prepared and the honeycomb body 2 made of silicon carbide SiC, etc. is formed. Electrode material sheets are molded in order to produce the positive electrode 3 and the negative electrode 4. The electrode material sheet is made of fired SiC-Si composite.

Next, these electrode material sheets are arranged on the outer circumferential surface 221 of the outer skin part 22 of the honeycomb body 2 through the conductive adhesive paste 51 containing SiC-Si composite, carbon, binder, etc.

Following, the honeycomb body 2 with the electrode material sheets is fired in argon (Ar) gas atmosphere of an ordinary (or atmospheric) pressure at a predetermined temperature (approximately 1600° C.). This makes it possible to produce the honeycomb structural body 1 in which the pair of the positive electrode 3 and the negative electrode 4 is formed on the outer circumferential surface 221 of the outer skin part 22 of the honeycomb body 2.

Next, a description will now be given of the actions and effects of the electrically heated catalyst (EHC) device 8 equipped with the honeycomb structural body 1 according to the first exemplary embodiment.

In the honeycomb body 2 of the honeycomb structural body 1 according to the first exemplary embodiment, the cell formation part 21 is covered with the outer skin part 22 of a cylindrical shape. A cross section of the honeycomb body 2 in a direction which is perpendicular to an axial direction of the honeycomb body 2 has a circular shape. Therefore, a distance in the facing direction X (shown in FIG. 1) between a part of the positive electrode 3 and a part of the negative electrode 4 is changed according to a part of the positive electrode 3 and the negative electrode 4, where the positive electrode 3 and a position of the negative electrode 4 are formed on the outer circumferential surface of the outer skin part 22 of the honeycomb body 2 along the circumferential direction. Specifically, a distance between the outside part of the positive electrode 3 and the outside part of the negative electrode 4 is shorter than a distance between a central part of the positive electrode 3 and a central part of the negative electrode 4. In other words, the more a part of the electrode is apart from the central part of the electrode, the more the distance in the facing direction X between the positive electrode 3 and the negative electrode 4 is decreased. The more the part of the electrode is close to the central part of the electrode, the more the distance in the facing direction X between the positive electrode 3 and the negative electrode 4 is increased.

This means that the more the distance in the facing direction X (shown in FIG. 1 and FIG. 2) between the positive electrode 3 and the negative electrode 4 is decreased, the more a current flows between the positive electrode 3 and the negative electrode 4. On the other hand, the more the distance in the facing direction X between the positive electrode 3 and the negative electrode 4 is increased, the more a magnitude of the current flowing between the positive electrode 3 and the negative electrode 4 is decreased. That is, the current is easy to flow in the outside part of the electrode when compared with the central part of the electrode.

Because the electrical resistance value of a conductor such as an electrode is in inverse proportion to a cross sectional area of the conductor, the thickness "t" of each of the positive electrode 3 and the negative electrode 4 is decreased from the central part to the outside of each of the electrodes. In each of the positive electrode 3 and the negative electrode 4, the electrical resistance value at the central part per unit length in the circumferential direction has the minimum value and the above electrical resistance value of the electrode is gradually increased toward the outside of the electrode in the circumferential direction of the honeycomb body 2. That is, when the distance of the part measured from the central part toward the end part is gradually increased, namely, when the distance between the positive electrode 3 and the negative electrode 4 which face to each other through the honeycomb body 2 is gradually decreased, the electrical resistance value of the electrode per unit length is gradually increased toward the outside of the electrode along the circumferential direction.

As previously described, because the thickness "t" of each of the positive electrode 3 and the negative electrode 4 is adjusted and the electrical resistivity of the part of the electrode is controlled on the basis of the distance between the positive electrode 3 and the negative electrode 4 which face to each other through the honeycomb body 2, it is possible to suppress the deviation of current distribution in the honeycomb body 2 between the positive electrode 3 and the negative electrode 4, and to flow uniform current in the entire of the honeycomb body 2 regardless of the electrical path in the honeycomb body 2 between the positive electrode 3 and the negative electrode 4.

This structure makes it possible to provide uniform current flowing through the inside of the honeycomb body 2. Because the structure of the honeycomb body 2 makes it possible to flow a uniform current through the inside of the honeycomb body 2, it is possible for the temperature of the honeycomb body 2 to increase uniformly and to suppress the temperature of the inside of the honeycomb body 2 from being fluctuated or changed even if the honeycomb body 2 has a circular shaped cross section.

Still further, this structure of the honeycomb body 2 makes it possible to suppress and relax the thermal stress generated in the honeycomb body 2 when electric power is supplied to the positive electrode 3 and the negative electrode 4 and the temperature of the inside of the honeycomb body 2 is increased. It is therefore possible to prevent cracks from being generated in the honeycomb structural body, and to suppress the honeycomb body 2 from being damaged and broken.

The honeycomb body 2 has a cross section of a circular shape which is perpendicular to an axial direction of the honeycomb body 2. The honeycomb body 2 has a cylindrical shape. This structure makes it possible to be easy to handle the honeycomb structural body 1. For example, this structure makes it possible to be easy to mount the honeycomb structural body 1 into the exhaust gas pipe of an exhaust gas purifying system of a motor vehicle. Further, this structure of the honeycomb body 2 makes it possible to store the honeycomb structural body 1 in the inside of the exhaust gas pipe while uniform pressure is supplied from the outer peripheral part to the honeycomb structural body 1. This makes it possible to suppress the honeycomb structural body 1 from being damaged and broken by vibration and stress and to maintain the honeycomb structural body 1 in the exhaust gas pipe for a long lifetime.

Still further, because the electrical resistivity of the honeycomb body 2 is larger than that of each of the positive electrode 3 and the negative electrode 4, it is possible to ensure for a current to flow uniformly in the entire of the electrode pair composed of the positive electrode 3 and the negative electrode 4 because the current flows uniformly in the entire of the honeycomb body 2 through the positive electrode 3 and the negative electrode 4. It is thereby possible for the entire of the honeycomb body 2 to be heated uniformly, and for the temperature of the entire of the honeycomb body 2 to increase uniformly.

The electrically heated catalyst (EHC) device 8 according to the first exemplary embodiment is equipped with the honeycomb structural body 1 having the structure previously described. This makes it possible for the entire of the honeycomb body 2 of the honeycomb structural body 1 to be heated uniformly, and for the temperature of the entire of the honeycomb body 2 to increase uniformly as soon as the electric power source 81 supplies electric power to the positive electrode 3 and the negative electrode 4. It is possible to activate the catalyst supported in the honeycomb body 2 with high efficiency, and thereby possible to execute the exhaust gas purifying process as soon as the electric power is supplied to the positive electrode 3 and the negative electrode 4 formed in the honeycomb body 2.

As previously described in detail, the first exemplary embodiment provides the honeycomb structural body 1 having the honeycomb body 2 and the electrically heated catalyst (EHC) device 8 capable of uniformly increasing the entire of the honeycomb body 2 and being easy to be mounted to the exhaust gas purifying system of a motor vehicle.

Still further, as shown in FIG. 1 and FIG. 2, the honeycomb structural body 1 equipped with the honeycomb body 2 according to the first exemplary embodiment has the structure in which the thickness "t" of each of the positive electrode 3 and the negative electrode 4 is gradually decreased from the central part to the outside end part thereof.

The concept of the present invention is not limited by the above structure. It is possible for the honeycomb structural body 1 to have another structure in which each of the electrodes 3 and 4 has a plurality of electrode parts having a different thickness and the thickness is decreased from the central part to the outside of each of the electrodes 3 and 4.

Figure 3:
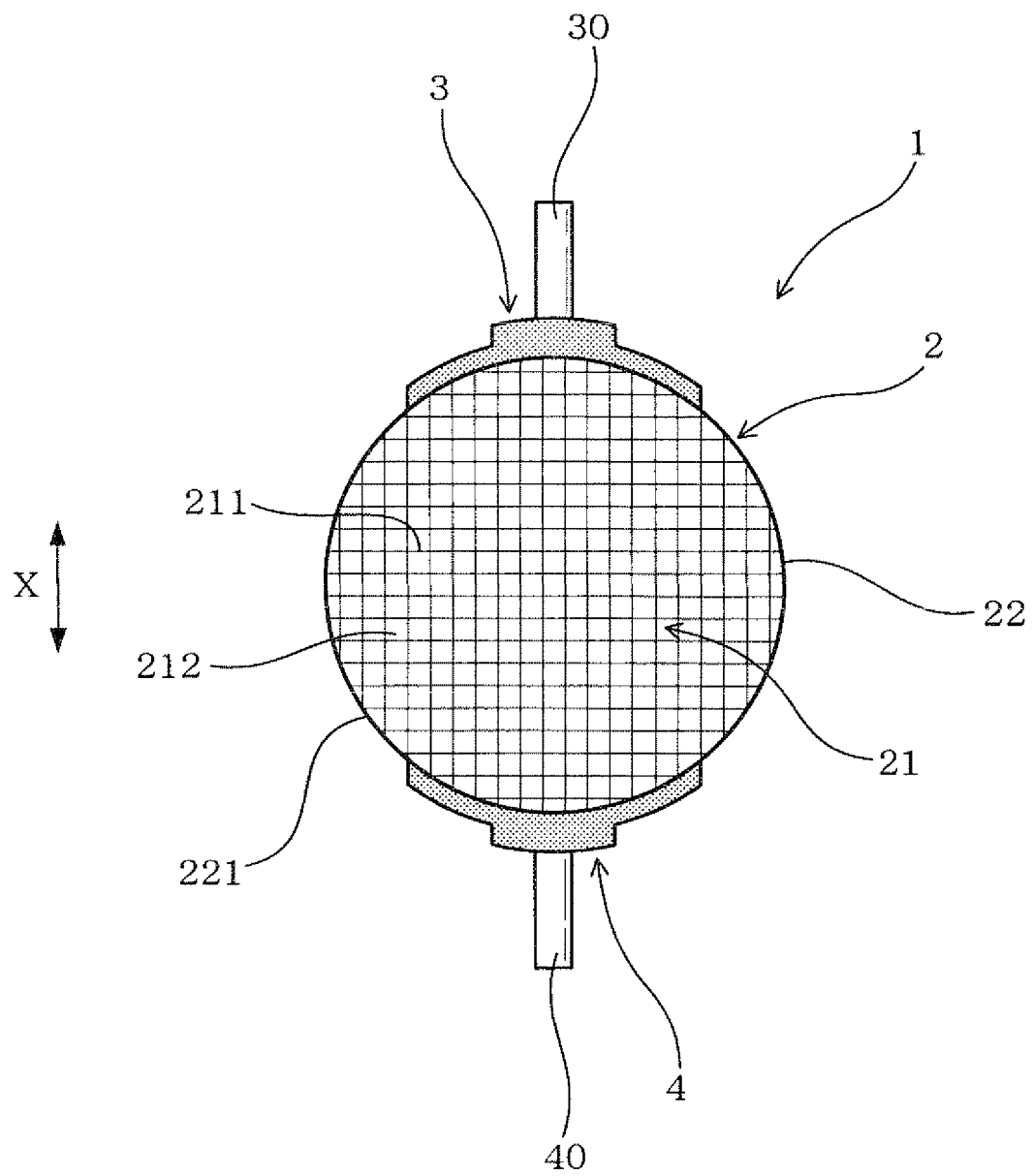
FIG. 3 is a view showing a cross section of a modification of the honeycomb structural body shown in FIG. 2, in which the thickness of each electrode is changed.

FIG. 3 is a view showing a cross section of a modification of the honeycomb structural body 1 shown in FIG. 2, in which each of the positive electrode 3 and the negative electrode 4 has the central part and the two side parts. As shown in FIG. 3, the central part is formed at the central position of each of the electrodes 3 and 4, and each of the side parts is formed adjacent to the central part in each of the electrodes 3 and 4. As shown in FIG. 3, the central part has the maximum thickness and the side parts formed adjacent to the central part have the thickness which is smaller than that of the central part.

Second Exemplary Embodiment

A description will be given of the honeycomb structural body 1-1 having the honeycomb body 2 and a positive electrode 3-1 and a negative electrode 4-1 with reference to FIG. 4.

Each of the positive electrode 3-1 and the negative electrode 4-1 has a different structure when compared with the structure of each of the positive electrode 3-1 and the negative electrode 4-1 shown in FIG. 1 and FIG. 2.

Figure 4:
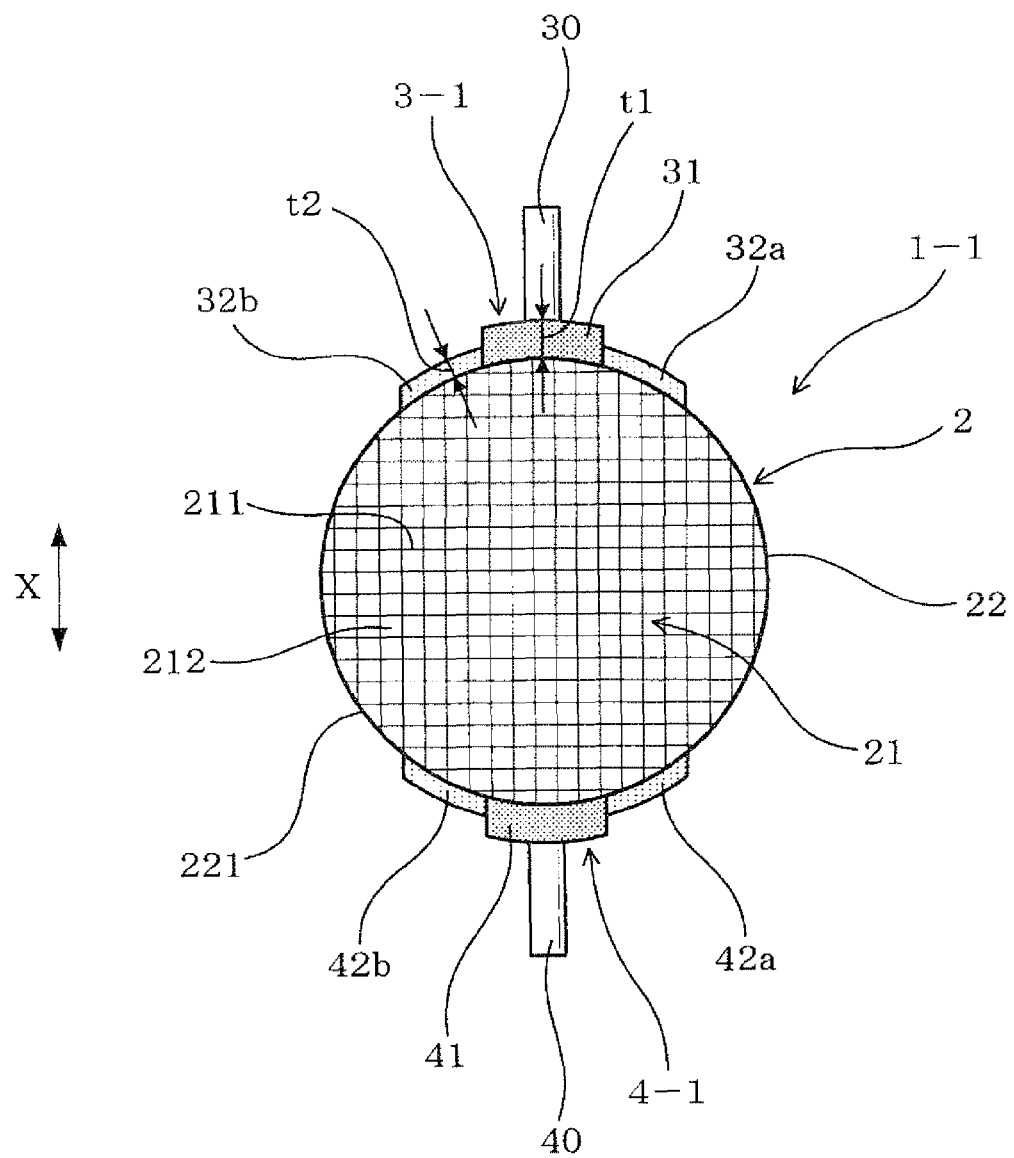
FIG. 4 is a view showing a cross section of a honeycomb structural body, which is perpendicular to an axial direction thereof, according to a second exemplary embodiment of the present invention.

FIG. 4 is a view showing a cross section of the honeycomb structural body 1-1, which is perpendicular to an axial direction thereof, according to the second exemplary embodiment of the present invention.

As shown in FIG. 4, the positive electrode 3-1 is comprised of a reference electrode part 31 and outside electrode parts 32a and 32b. The reference electrode 31 is formed at a central part of the positive electrode 3 in the circumferential direction. The outside electrode parts 32a and 32b are arranged at both sides of the reference electrode part 31 in the circumferential direction.

Similar to the positive electrode 3-1, the negative electrode 4-1 is comprised of a reference electrode part 41 and outside electrode parts 42a and 42b. The reference electrode 41 is formed at a central part of the positive electrode 4 in the circumferential direction. The outside electrode parts 42a and 42b are arranged at both sides of the reference electrode part 41 in the circumferential direction.

The reference electrode parts 31 and 41 face to each other, namely, are opposite to each other, and make a pair in the direction X shown in FIG. 4. Similarly, the outside electrode parts 32a and 32b and the outside electrode parts 42a and 42b face to each other, namely, are opposite to each other, and make a pair in the direction X shown in FIG. 4.

In each of the electrodes 3-1 and 44, the reference electrode part 31 (41) is larger in thickness than the outside electrode parts 32a and 32b (42a and 42b).

A description will now be given of the thickness of each of the reference electrode part and the outside electrode parts of the positive electrode 3-1 and the negative electrode 4-1 formed in the honeycomb structural body 1-1 in detail.

As shown in FIG. 4, the positive electrode 3-1 is comprised of the reference electrode part 31 and the outside electrode parts 32a and 32b. The reference electrode part 31 is formed at the central part of the positive electrode 3 in a circumferential direction. The outside electrode parts 32a and 32b are formed at both sides of the reference electrode part 31 in a circumferential direction. That is, the positive electrode 3-1 is comprised of the single reference electrode part 31 and the two outside electrode parts 32a and 32b formed at both sides of the reference electrode part 31. Each of the reference electrode part 31 and the outside electrode parts 32a and 32n is made of porous conductive ceramics composed of SiC-Si composite.

A positive electrode terminal 30 is formed on the reference electrode part 31. The positive electrode terminal 30 is formed at the central part of the reference electrode part 31 in a circumferential direction and at the central part in an axial direction of the honeycomb body 2.

On the other hand, as shown in FIG. 4, the negative electrode 4-1 is comprised of the reference electrode part 41 and the outside electrode parts 42a and 42b. The reference electrode part 41 is formed at the central part of the negative electrode 4-1 in a circumferential direction. The outside electrode parts 42a and 42b are formed at both sides of the reference electrode part 41 in a circumferential direction. That is, the negative electrode 4-1 is comprised of the single reference electrode part 41 and the two outside electrode parts 42a and 42b formed at both sides of the reference electrode part 41. Each of the reference electrode part 41 and the outside electrode parts 42a and 42b is made of porous conductive ceramics composed of SiC-Si composite.

A negative electrode terminal 40 is formed on the reference electrode part 41. The negative electrode terminal 40 is formed at the central part of the reference electrode part 41 in a circumferential direction and at the central part in an axial direction of the honeycomb body 2.

As shown in FIG. 4, the reference electrode part 31 of the positive electrode 3-1 and the reference electrode part 41 of the negative electrode 4-1 are formed opposite to each other in the facing direction X thereof, namely in a radial direction of the honeycomb body 2. The reference electrode part 31 and the reference electrode part 41 are symmetric with respect to the facing direction X.

Still further, the outside electrode parts 32a and 32b of the positive electrode 3-1 and the outside electrode parts 42a and 42b of the negative electrode 4-1 are symmetric with respect to the facing direction X of the positive electrode 3 and the negative electrode 4 as the electrode pair. That is, the outside electrode parts 32a and 32b and the outside electrode parts 42a and 42b make a pair of the outside electrode parts 32a and 42a and a pair of the outside electrode parts 32b and 42b in the facing direction X.

Figure 5:
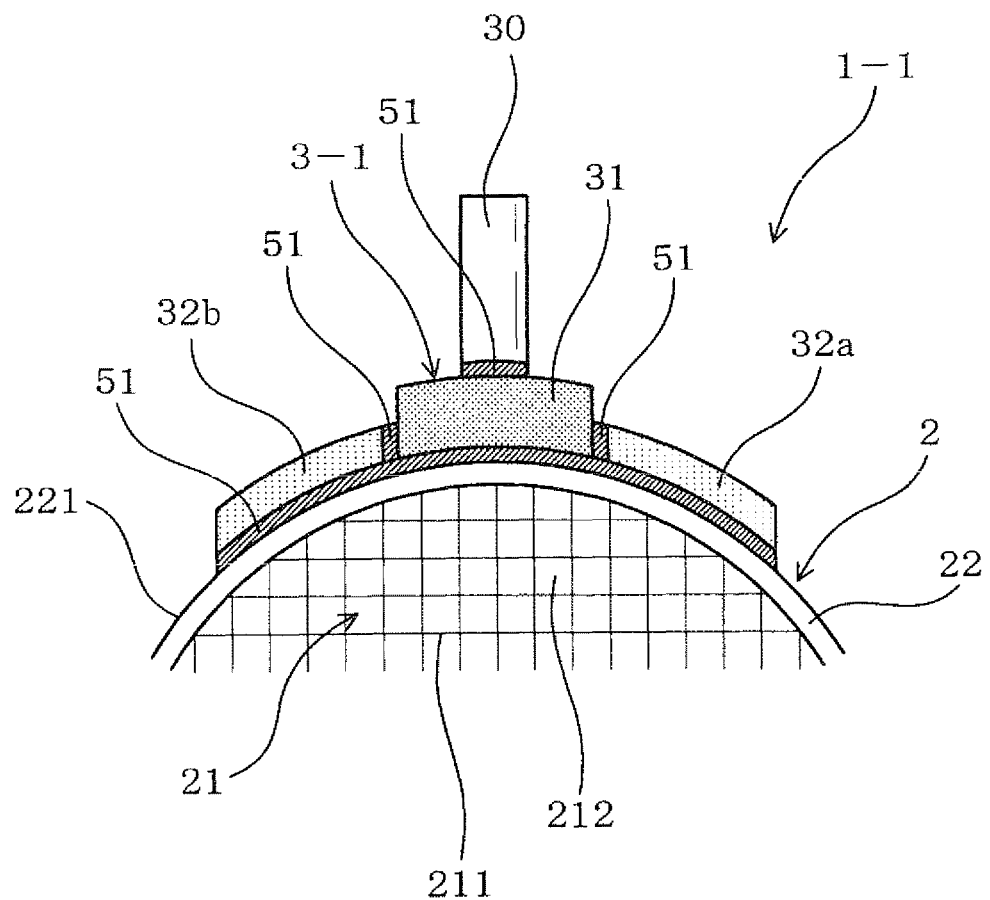
FIG. 5 is a view showing an enlarged cross section of a part around a positive electrode formed on a surface of the honeycomb structural body according to the second exemplary embodiment of the present invention.

FIG. 5 is a view an enlarged cross section of a part around the positive electrode 3-1 formed on the circumferential surface of the skin part 221 of the honeycomb body 2 in the honeycomb structural body 1-1 according to the second exemplary embodiment of the present invention.

As shown in FIG. 5, in the positive electrode 3-1, the reference electrode part 31 and the outside electrode parts 32a and 32b are adjacent to each other. That is, the outside electrode parts 32a and 32b are adjacent to both the sides of the reference electrode part 31. The reference electrode part 31 and the outside electrode part 32a are connected together by conductive adhesive 51. The reference electrode part 31 and the outside electrode part 32b are connected together by the conductive adhesive 51. The conductive adhesive 51 is made of paste containing SiC-Si composite, carbon, binder, etc. As previously described, the positive electrode 3-1 is made of conductive ceramics composed of such SiC-Si composite.

In addition, the reference electrode part 31 and the outside electrode parts 32a and 32b are bonded to the outer circumferential surface 221 of the outer skin part 22 of the honeycomb body 2 through the conductive adhesive 51. That is, the conductive adhesive 51 is applied onto the outer circumferential surface 221 so that the conductive adhesive 51 is sandwiched between the outer circumferential surface 221 and the reference electrode part 31 and the outside electrode parts 32a and 32b.

Further, the electrode terminal 30 is bonded to the reference electrode part 31 through the conductive adhesive 51 sandwiched between the electrode terminal 30 and the reference electrode part 31.

On the other hand, as omitted from FIG. 5, the negative electrode 4-1 has the same structure of the positive electrode 3-1 shown in FIG. 4. That is, in the negative electrode 44, the reference electrode part 41 and the outside electrode parts 42a and 42b are adjacent to each other. The reference electrode part 41 is adjacent to the outside electrode parts 42a and 42b at both sides of the reference electrode part 41. The reference electrode part 41 and the outside electrode part 42a are connected together by conductive adhesive 51. The reference electrode part 41 and the outside electrode part 42b are connected together by the conductive adhesive 51. In addition, the reference electrode part 41 and the outside electrode parts 42a and 42b are bonded to the outer circumferential surface 221 of the outer skin part 22 of the honeycomb body 2 through the conductive adhesive 51. That is, the conductive adhesive 51 is applied onto the outer circumferential surface 221 so that the conductive adhesive 51 is sandwiched between the outer circumferential surface 221 and the reference electrode part 41 and the outside electrode parts 42a and 42b. Further, the electrode terminal 40 is bonded to the reference electrode part 41 through the conductive adhesive 51 sandwiched between the electrode terminal 40 and the reference electrode part 41.

As shown in FIG. 4, the thickness of the reference electrode part 31 in the positive electrode 3-1 is larger than the thickness of each of the outside electrode parts 32a and 32b adjacent at both the ends of the reference electrode part 31 along the circumferential direction.

Similar to the positive electrode 3-1, the thickness of the reference electrode part 41 in the negative electrode 4-1 is larger than the thickness of each of the outside electrode parts 42a and 42b adjacent at both the ends of the reference electrode part 41 along the circumferential direction.

In the positive electrode 3-1 and the negative electrode 4-1, the reference electrode part 31 and the reference electrode part 41 have the same thickness "t1" of 2 mm (t1=2 mm). Further, the outside electrode parts 32a and 32b and the outside electrode parts 42a and 42b have the same thickness "t2" of 0.5 mm (t2=0.5 mm).

The electrical resistivity of the honeycomb body 2 is larger than the electrical resistivity of each of the reference electrode part 31, the reference electrode part 41, the outside electrode parts 32a and 32b and the outside electrode parts 42a and 42b.

Other components of the honeycomb structural body 1-2 according to the second exemplary embodiment are the same of those of the honeycomb structural body 1 according to the first exemplary embodiment.

In the secondary exemplary embodiment, each of the positive electrode 3-1 and the negative electrode 4-1 is divided to the plurality of the electrode parts along the circumferential direction so that each of the electrode parts forming the positive electrode 3-1 and the negative electrode 4-1 has a stepwise thickness structure which is stepwise decreased according to the distance between the positive electrode 3-1 and the negative electrode 4-1.

As shown in FIG. 4, in the positive electrode 3-1 and the negative electrode 4-1 in the honeycomb structural body 1-1 according to the second exemplary embodiment, the outside electrode part 32a is formed at one end of the reference electrode part 31, and the outside electrode part 32b is formed at the other end of the reference electrode part 31. Similarly, the outside electrode part 42a is formed at one end of the reference electrode part 41, and the outside electrode part 42b is formed at the other end of the reference electrode part 41.

The concept of the present invention is not limited by this structure. It is possible for each of the positive electrode and the negative electrode to have a structure in which three or more outside electrode parts are formed at one end and the other end of each of the reference electrode, respectively, along the circumferential direction of the honeycomb body 2.

Figure 6:
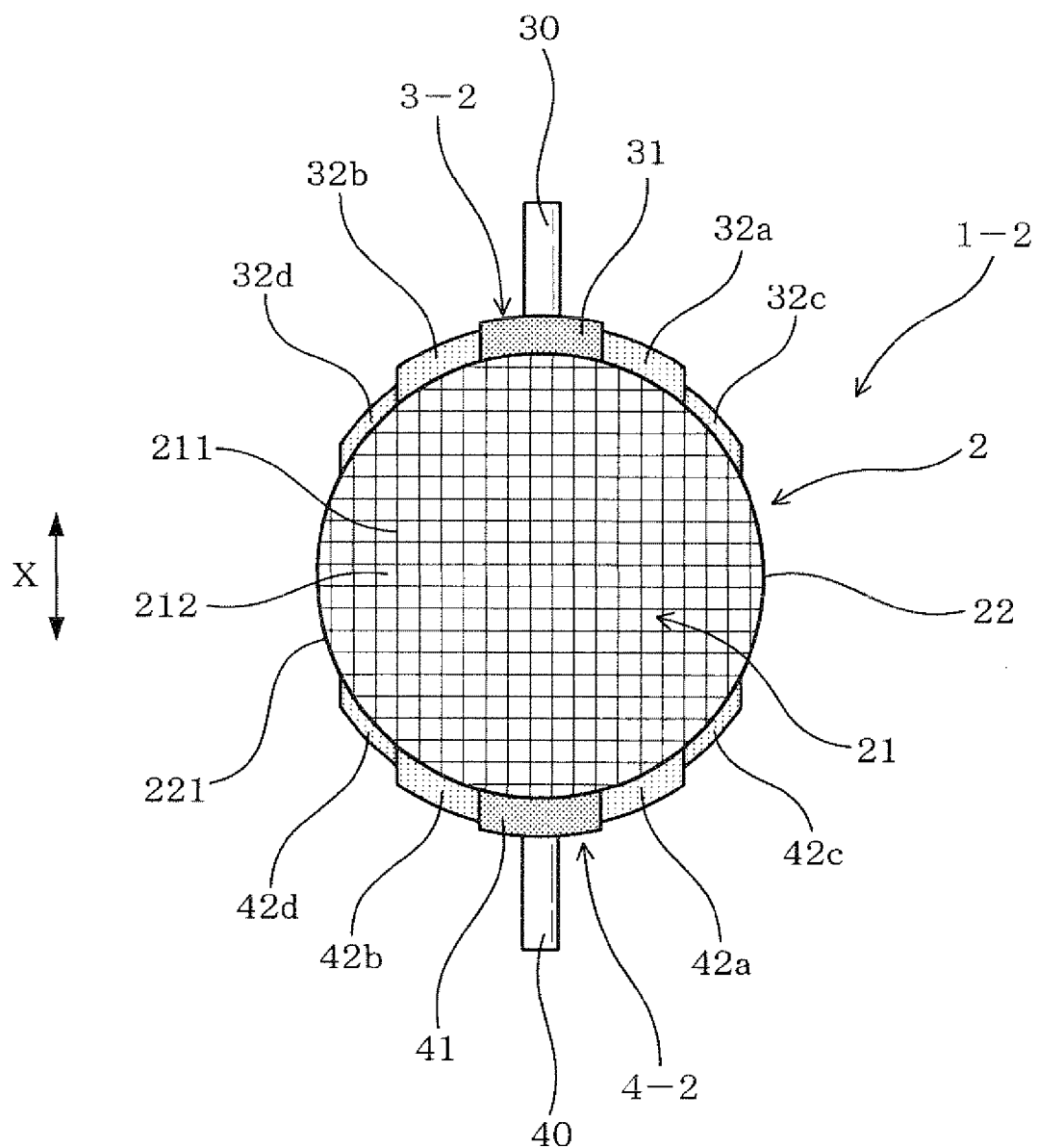
FIG. 6 is a view showing a cross section of a modification of the structure of the positive electrode and the negative electrode in the honeycomb structural body shown in FIG. 4.

FIG. 6 is a view showing a cross section of a modification of the structure of the positive electrode and the negative electrode in the honeycomb structural body shown in FIG. 4.

For example, in the honeycomb structural body 1-2 as shown in FIG. 6, it is possible for the positive electrode 3-2 and the negative electrode 4-2 to have the structure in which:

(a) the outside electrode parts 32a and 32c are formed at one end of the reference electrode part 31, the outside electrode parts 32b and 32d are formed at the other end of the reference electrode part 31, and the reference electrode part 31 is thicker than each of the outside electrode part 32a and 32b, and each of the outside electrode parts 32a and 32b is thicker than each of the outside electrode part 32c and 32d; and (b) the outside electrode parts 42a and 42c are formed at one end of the reference electrode part 41, the outside electrode parts 42b and 42d are formed at the other end of the reference electrode part 41, and the reference electrode part 41 is thicker than each of the outside electrode part 42a and 42b, and each of the outside electrode parts 42a and 42b is thicker than each of the outside electrode part 42c and 42d.

That is, in the structure of the honeycomb structural body 1-2, the thickness of each of the divided electrode parts of each of the electrodes 3-2 and 4-2 is decreased stepwise toward the outside in the circumferential direction when observed from the reference electrode part. This structure shown in FIG. 6 makes it possible for the temperature of the inside of the honeycomb body 2 to more increase uniformly.

Third Exemplary Embodiment

A description will be given of the honeycomb structural body 1-3 equipped with the positive electrode 3-3 and the negative electrode 4-3 having other structure according to the third exemplary embodiment with reference to FIG. 7 and FIG. 8.

Figure 7:
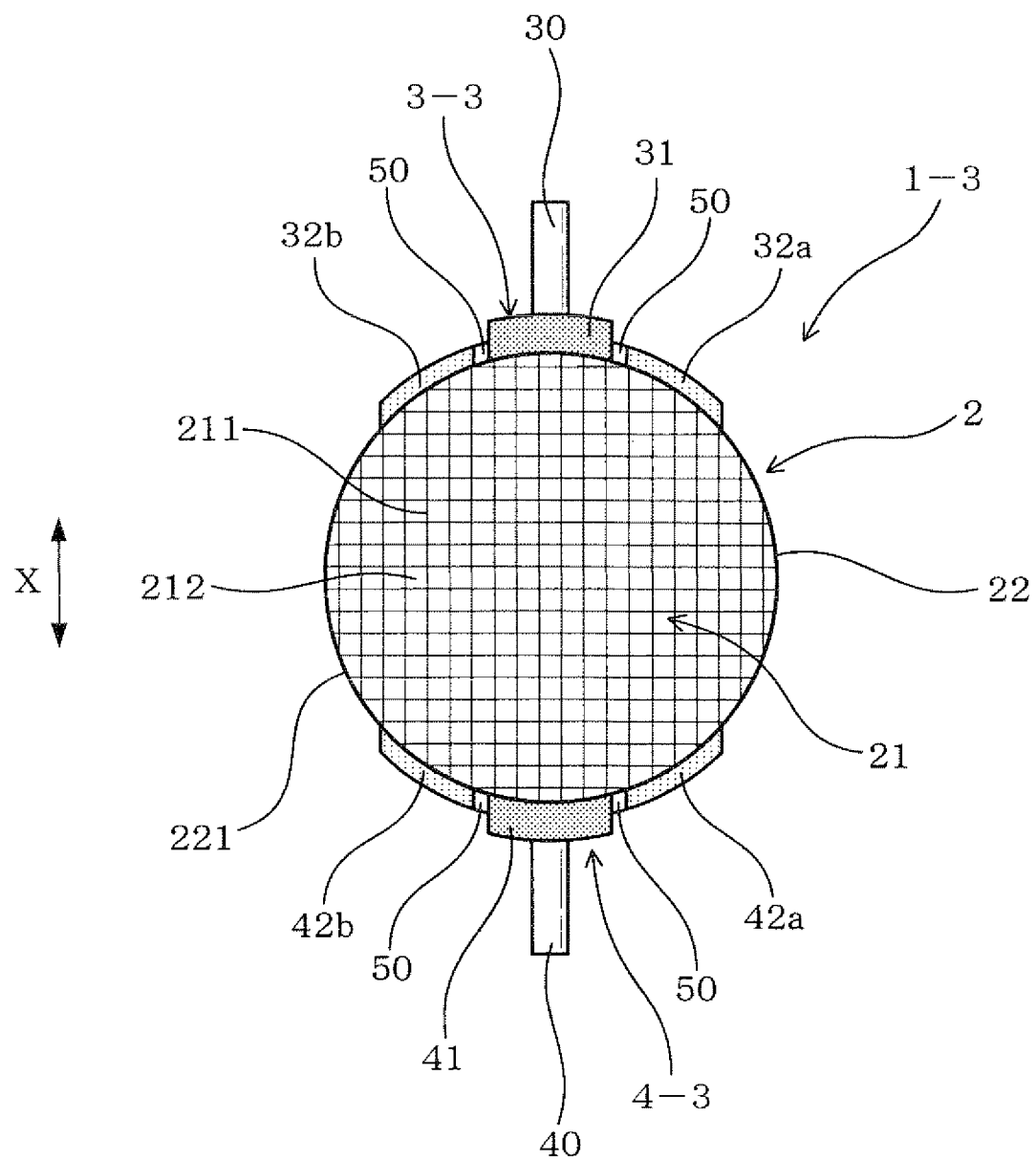
FIG. 7 is a view showing a cross section of a honeycomb structural body, which is perpendicular to an axial direction thereof, according to a third exemplary embodiment of the present invention.

FIG. 7 is a view showing a cross section of the honeycomb structural body 1-3, which is perpendicular to an axial direction thereof, according to the third exemplary embodiment of the present invention. FIG. 8 is a view showing an enlarged cross section of a part around the positive electrode 3-3 formed on the surface of the honeycomb body 2 in the honeycomb structural body 1-3 according to the third exemplary embodiment.

Figure 8:
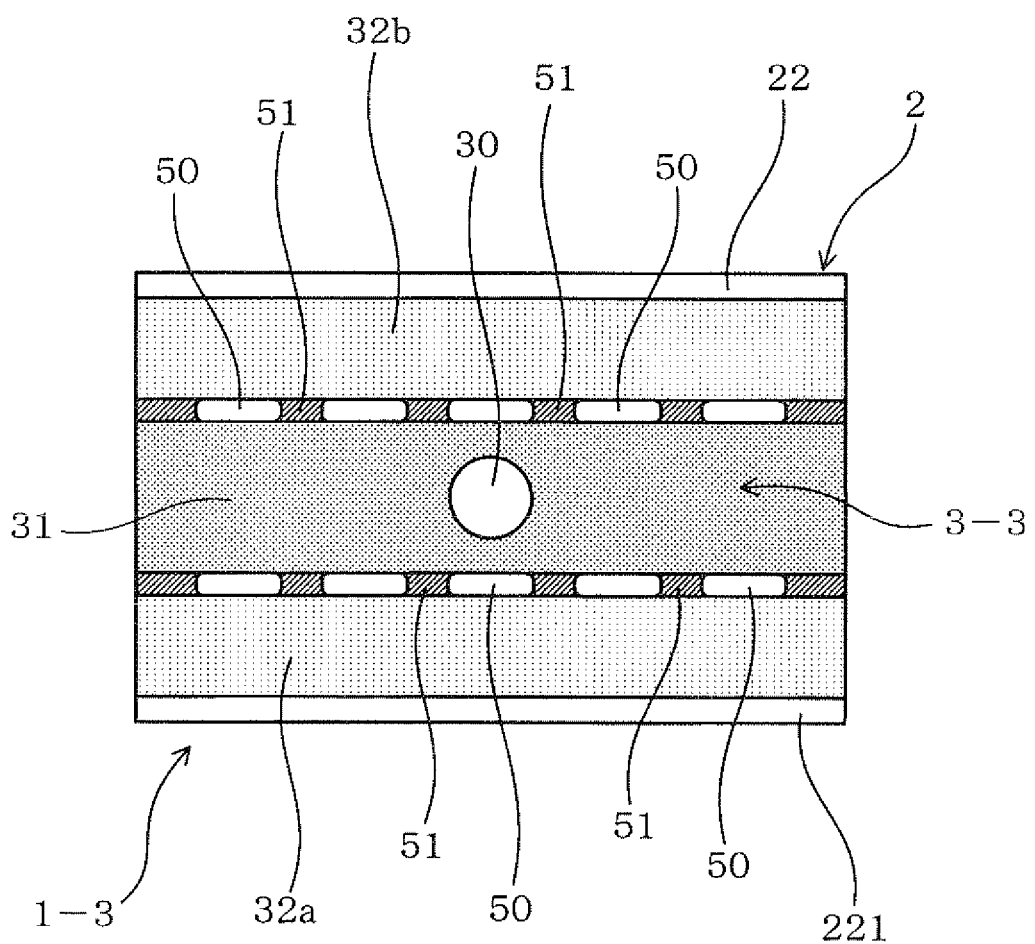
FIG. 8 is a view showing an enlarged cross section of a part around a positive electrode formed on the surface of the honeycomb body in the honeycomb structural body according to the third exemplary embodiment of the present invention.

As shown in FIG. 7 and FIG. 8, in the positive electrode 3-3, gaps 50 are formed between the reference electrode part 31 and the outside electrode part 32a, and gaps 50 are formed between the reference electrode part 31 and the outside electrode part 32b. Similar to the positive electrode 3-3, in the negative electrode 4-3, gaps 50 are formed between the reference electrode part 41 and the outside electrode part 42a, and gaps 50 are formed between the reference electrode part 41 and the outside electrode part 42b.

Specifically, as shown in FIG. 8, the reference electrode part 31 and the outside electrode part 32a, which are adjacent to each other, are bonded with the conductive adhesive 51. In particular, the gaps 50 are formed between the reference electrode part 31 and the outside electrode part 32a. The gaps 50 do not contain any conductive adhesive 51.

Similarly, the reference electrode part 31 and the outside electrode part 32b which are adjacent to each other are bonded with the conductive adhesive 51. In particular, the gaps 50 are formed between the reference electrode part 31 and the outside electrode part 32b. The gaps 50 do not contain any conductive adhesive 51.

On the other hand, as omitted from FIG. 8, the negative electrode 4-3 has the same structure of the positive electrode 3-3. That is, the reference electrode part 41 and the outside electrode part 42a which are adjacent to each other are bonded with the conductive adhesive 51. In particular, the gaps 50 are formed between the reference electrode part 41 and the outside electrode part 42a. The gaps 50 do not contain any conductive adhesive 51. Similarly, the reference electrode part 41 and the outside electrode part 42b which are adjacent to each other are bonded with the conductive adhesive 51. In particular, the gaps 50 are formed between the reference electrode part 41 and the outside electrode part 42b. The gaps 50 do not contain any conductive adhesive 51.

Other components of the honeycomb structural body 1-2 according to the third exemplary embodiment are the same of those of the honeycomb structural body 1-1 according to the second exemplary embodiment.

The structure of the honeycomb structural body 1-3 according to the third exemplary embodiment makes it possible to suppress or relax the stress applied when the honeycomb structural body 1-3 is placed in the exhaust gas pipe of an exhaust gas purifying system of a motor vehicle and to suppress or relax vibration generated when the motor vehicle is driving. This makes it possible to prevent cracks from being generated in the honeycomb structural body 1-3 and to prevent the honeycomb structural body 1-3 from being damaged and broken.

Other actions and effects of the honeycomb structural body 1-3 according to the third exemplary embodiment are the same of these of the honeycomb structural body 1-1 according to the second exemplary embodiment.

It is also possible for the honeycomb structural body 1-3 according to the third exemplary embodiment to have the electrode structure shown in FIG. 6. That is, it is possible for the electrodes in the honeycomb structural body 1-3 to have the outside electrode parts 32a, 32b, 42a, and 42b and the most outside electrode parts 32c, 32d, 42c and 42d. That is, the outside electrode part 32a (42a) and the most outside electrode parts 32c (42c) are formed at one end of the reference electrode part 31 (41), and the outside electrode part 32b (42b) and the most outside electrode parts 32d (42d) are formed at the other end of the reference electrode part 31 (41). In this structure, the gaps 50 are formed between the outside electrode part 32a (42a) and the most outside electrode parts 32c (42c). This structure makes it possible to further prevent cracks from being generated in the honeycomb structural body.

Fourth Exemplary Embodiment

A description will be given of the honeycomb structural body 1-4 equipped with the electrodes of another structure according to the fourth exemplary embodiment with reference to FIG. 9, FIG. 10 and FIG. 11.

FIG. 9 is a view showing an enlarged cross section of a part around the positive electrode 3-4 formed on the surface of the honeycomb body 2 in the honeycomb structural body 1-4 according to the fourth exemplary embodiment of the present invention. FIG. 10 is a view showing a cross section of the honeycomb structural body 1-4 along the line B-B shown in FIG. 9.

As shown in FIG. 9 and FIG. 10, the honeycomb structural body 1-4 has the positive electrode 3-4 and the negative electrode 4-4 which are different in structure from the positive electrode 3-1 and the negative electrode 4-1 of the honeycomb structural body 1-1 shown in FIG. 4 and FIG. 5 according to the second exemplary embodiment.

That is, as shown in FIG. 9 and FIG. 10, the positive electrode 3-4 is comprised of the reference electrode part 31, the outside electrode part 32a, the outside electrode part 32b and a gap 59. Further, the positive electrode 4-4 is comprised of the reference electrode part 41, the outside electrode part 42a, the outside electrode part 42b and a gap 59.

Specifically, as shown in FIG. 9 and FIG. 10, in the positive electrode 3-4, each of the outside electrode parts 32a and 32b is bonded onto the outer circumferential surface 221 of the outer skin part 22 of the honeycomb body 2 by conductive adhesive 51. In particular, as shown in FIG. 9, the gap 59 contains no conductive adhesive and is formed between each of the outside electrode parts 32a, 32b and the outer circumferential surface 221 of the outer skin part 22 of the honeycomb body 2.

Similar to the positive electrode 3-4, the negative electrode 4-4 has the same structure of the positive electrode 3-4. Therefore the explanation of the negative electrode 4-4 is omitted here. That is, in the negative electrode 4-4, each of the outside electrode parts 42a and 42b is bonded onto the outer circumferential surface 221 of the outer skin part 22 of the honeycomb body 2 by conductive adhesive 51. The gap 59 contains no conductive adhesive and is formed between each of the outside electrode parts 42a, 42b and the outer circumferential surface 221 of the outer skin part 22 of the honeycomb body 2.

As shown in FIG. 10, it is acceptable to form the gap 59 along an axial direction of the honeycomb body 2. This structure introduces exhaust gas into the gap 59. This has a possibility of decreasing the capability of purifying exhaust gas, and of decreasing the bonding strength between the positive electrode 3-4 and the negative electrode 4-4 and the honeycomb body 2.

In order to eliminate this, it is possible to apply adhesive 51 on both end parts of the gap 59 along an axial direction, as shown in FIG. 11 which shows a cross section of another structure of the honeycomb structural body along the line B-B shown in FIG. 9.

Other actions and effects of the honeycomb structural body 1-4 according to the fourth exemplary embodiment are the same of these of the honeycomb structural body 1-2 according to the second exemplary embodiment.

The presence of the gaps 59 shown in FIG. 9, FIG. 10 and FIG. 11 can adjust the electrical resistance value, namely, electrical resistivity at the outside parts (such as the outside electrode parts 32a, 32b, 42a and 42b) of the positive electrode 3-4 and the negative electrode 4-4. Specifically, it is possible to increase the electrical resistance value of the outside parts of each of the positive electrode 3-4 and the negative electrode 4-4 in order to prevent a current from flowing to the outside of the positive electrode 3-4 and the negative electrode 4-4. This structure makes it possible to suppress deviation from a uniform distribution of current flowing in the inside of the honeycomb body 2. That is, the structure of the honeycomb structural body 1-4 according to the fourth exemplary embodiment enhances the effect to decrease the deviation from a uniform distribution of current flowing in the honeycomb body 2.

Other actions and effects of the honeycomb structural body 1-4 according to the fourth exemplary embodiment are the same of these of the honeycomb structural body 1-2 according to the second exemplary embodiment.

Fifth Exemplary Embodiment

A description will be given of the fifth exemplary embodiment according to the present invention.

The fifth exemplary embodiment detects the temperature rising capability of test samples as the honeycomb body in the honeycomb structural body.

The fifth exemplary embodiment prepared nine test samples 1 to 9 as the honeycomb structural body. The fifth exemplary embodiment detected each of test samples 1 to 9 when electric power was supplied to each of test samples 1 to 9 in order to detect a temperature distribution in test sample.

A description will now be given of the structure of each of test samples 1 to 9.

Test samples 1 and 2 have a conventional structure of the honeycomb structural body in which a pair of electrodes such as a positive electrode and a negative electrode is formed on an outer peripheral surface of the honeycomb body.

On the other hand, test samples 3 to 9 have the same structure of the honeycomb structural body according to the second and fourth exemplary embodiments (shown in FIG. 4, FIG. 5, FIG. 9 and FIG. 10). That is, in each of test samples 3 to 9, the electrode pair having the positive electrode and the negative electrode is formed on the outer peripheral surface of the honeycomb body and each of the electrodes is comprised of the reference electrode part and the outside electrode parts, and the outside electrode parts are formed at both the ends of the reference electrode part. In particular, the reference electrode part is different in thickness from each of the outside electrode parts (as shown in FIG. 4, FIG. 5, FIG. 9 and FIG. 10). That is, the thickness of the reference electrode part is larger than that of each of the outside electrode parts.

Each of test samples 1 to 9 has the honeycomb body made of conductive silicon carbide SiC. Each of test samples 1 to 9 has an outer diameter of 93 mm and a length of 100 mm. In each of test samples 1 to 9, the total number of cells is 400 cell per square inch (cpsi), and a thickness of each partition wall is 6 mil (mil=$\frac{1}{1000}$ inch). The electrical resistance value of the honeycomb body in each of test samples 1 to 9 is 12Ω.

There are various methods of detecting the electrical resistance value of the honeycomb body in the honeycomb structural body. For example, one conventional method of detecting the electrical resistance value of the honeycomb body uses a multi-meter, etc. Such a multi-meter, known as a multi-tester or a volt-ohm meter (VOM), is an electronic measuring instrument that combines several measurement functions in one unit. A typical multi-meter may include features such as the capability of measuring voltage, current and resistance. Electrodes are formed by using mesh shaped metal, plate shaped metal or Ag paste having a low electrical resistivity. When a constant current (for example 1 A) flows between the electrodes, such a multi-meter detects a voltage between the electrodes. The electrical resistance value is calculated on the basis of the detected voltage. It is possible to obtain a desired electrical resistance value of the honeycomb body by adjusting the size of the honeycomb body and a current to be supplied to the electrode formed on the outer peripheral surface of the honeycomb body.

Figure 13:
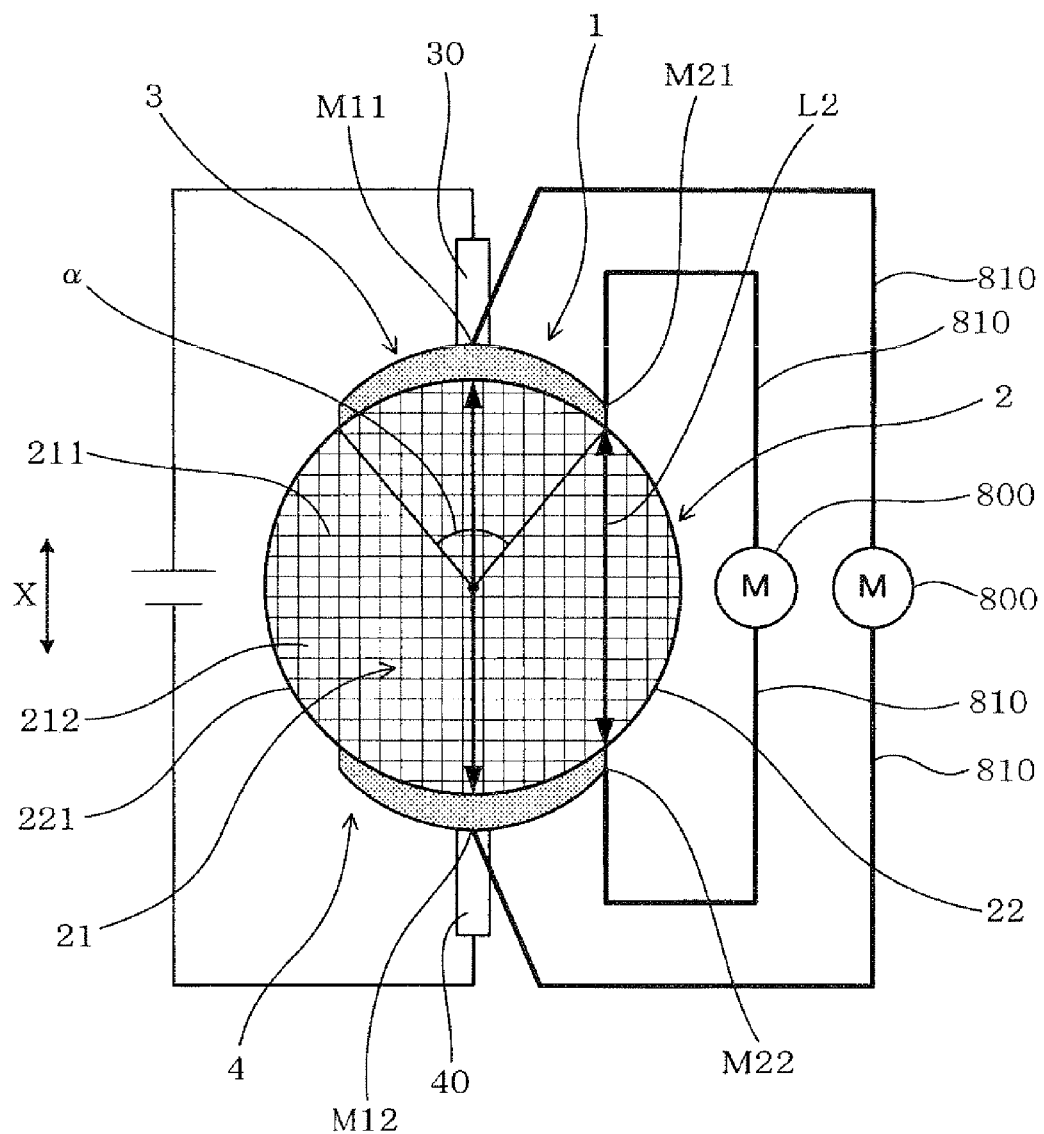
FIG. 13 is a view showing a method of detecting an electrical resistance value of the honeycomb structural body in the sixth exemplary embodiment of the present invention.

In the sixth exemplary embodiment, each of test samples 1 to 9 has the same electrode angle α of 78° (see FIG. 13). FIG. 13 is a view showing a method of detecting the electrical resistance value of each of test samples as the honeycomb structural body according to the sixth exemplary embodiment of the present invention.

This electrode angle α is an angle between the central point of the honeycomb body and both ends of each of the positive electrode and the negative electrode.

Each of the reference electrode part and the outside electrode parts in the positive electrode and the negative electrode has the same circumferential length of 21.1 mm measured along the circumferential direction of the honeycomb body.

In particular, it is preferable for the honeycomb body in the honeycomb structural body to have the electrode angle α of 78±10°.

When the honeycomb body has a large electrode angle α, that is, when the electrode angle α of the honeycomb body exceeds the range of 78±10°, (exceeds 88°), a current more easily flows between the positive electrode and the negative electrode because the distance between the electrode pair is decreased.

On the other hand, when the honeycomb body has a small electrode angle α, that is, when the electrode angle α of the honeycomb body is less than the range of 78±10°, (less than 68°), this makes a difficulty to flow a current between the positive electrode and the negative electrode because the distance between the electrode pair is decreased. This makes a current not to flow in the outside part of the electrodes, and this thereby decreases the temperature of the honeycomb body.

As shown in FIG. 13, the longest distance L1 between of the electrode pair is the distance between the central part of the reference electrode part in the positive electrode and the central part of the reference electrode part in the negative electrode. Each of test samples 1 to 9 has the longest distance L1 of 93 mm.

On the other hand, the shortest distance L2 between of the electrode pair is the distance between the most outside part in the outside electrode part in the positive electrode and the most outside part in the outside electrode part in the negative electrode. Each of test samples 1 to 9 has the shortest distance L2 of 72.3 mm. In each of test samples 1 to 9, (L1−L2)/L1 was the value of 0.22.

A description will now be given of the method of producing the honeycomb structural body (as test samples 1 to 9).

First, the honeycomb body made of conductive silicon carbide SiC was produced.

Electrode material was prepared, which was used as the reference electrode part and the outside electrode parts in each of the positive electrode and the negative electrode in each of test samples 1 to 9. Specifically, silicon carbide SiC powder and carbon C powder of a predetermined compositional ratio (namely, 62 mass % of silicon carbide SiC powder: 38 mass % of carbon C powder) were mixed. Binder, water and lubricating oil were added into the prepared mixture. The obtained clay mixture was extruded and molded to make a molded body as each test sample. The molded body has a cylindrical pipe shape having an inner diameter of 93 mm, a thickness of 5 mm, and a length of 120 mm.

Next, the molded body was cut into a plurality of divided parts having a predetermined length. Metallurgical silicon (Si) powder, water and alcohol solvent, binder to adjust clay state were mixed to make slurry. The obtained slurry was applied on the surface of each of the divided molded bodies as test samples. The fifth exemplary embodiment did not limit the quantity of slurry applied on the surface of the molded body when visible slurry was formed on the surface of the molded body. After this, the molded bodies were fired at 1700° C. over two hours under argon gas atmosphere. This made the molded bodies as test samples with the electrode material.

The electrical resistivity of the electrode material was 0.05 Ω·cm. The electrical resistivity of the electrode material was calculated by the following method.

The electrical resistance value of the electrode material was detected by the same method previously described. After this, the length and a cross sectional area of the electrode material was detected. Finally, the electrical resistivity "R" of the electrode material was detected by the following equation.

$R = \rho \times (L/A)$, where R is an electrical resistance value, $\rho$ is an electrical resistivity (Ω·cm), L is a length (cm), and A is a cross sectional area (cm$^2$).

Adhesive paste was prepared, which was used to bond the reference electrode part and the outside electrode parts onto the honeycomb body as test samples.

Specifically, adhesive paste was made of the same material of the electrode material previously described. The adhesive paste was made by mixing silicon carbide SiC powder, carbon C powder having the same compositional ratio of the electrode material, metallurgical silicon Si powder, binder to adjust the clay state and water.

The metallurgical silicon Si powder having (15×SiC(mass %)/85)+(C(mass %)×2.34) mass % was added to produce the adhesive paste when the mixture of silicon carbide SiC powder and carbon C powder had 100 mass %.

Binder to adjust clay state of 8 mass % was added when the mixture of silicon carbide SiC powder, carbon C powder and silicon Si powder had 100 mass %. Water of 45 mass % was added when the mixture of silicon carbide SiC powder, carbon C powder and silicon Si powder had 100 mass %. Further, methylcellulose was used as binder to adjust clay state.

After a pair of electrodes was formed on the outer peripheral surface of the honeycomb body as each test sample, test samples were fired at 1600° C. over two hours in argon gas atmosphere.

Table 1 shows the thickness of each of the reference electrode and the outside electrode part in each electrode of test samples 1 to 9.

Similar to the case of the fourth exemplary embodiment shown in FIG. 9 and FIG. 10, as previously described, each of test samples 7 to 9 had a gap formed between the outside electrode parts and the honeycomb body.

Test sample 7 had the gap of a length of ¼ times of the outside electrode part in the circumferential direction.

Test sample 8 had the gap of a length of 2/4 times of the outside electrode part in the circumferential direction.

Test sample 9 had the gap of a length of ¾ times of the outside electrode part in the circumferential direction.

The volume of the gap in test samples 7, 8 and 9 had 0.3 cm$^3$, 0.5 cm$^3$ and 0.8 cm$^3$, respectively.

Adhesive used in each of test samples 1 to 9 had the thickness of approximately 0.5 mm. Because the thickness of the outside electrode in each test sample was thin, that is, because it is difficult to fire the outside electrode in each test sample, electrode material paste was applied on the surface of the honeycomb body, and then fired it in order to make the outside electrode part. The electrode material paste had a thickness of 0.5 mm. Each test sample had the electrode terminal of a diameter of 12 mm and a length of 15 mm. In each test sample, the electrode terminal was made of the same material of the electrode material. The reference electrode part on which, the electrode terminal was formed was made of the electrode material having a low electrical resistivity. This makes it possible to prevent a part between the electrode terminals from being partially heated.

TABLE 1

| Test sample No. | Reference electrode part Thickness (mm) | Outside electrode part Thickness (mm) | Gap Presence | Gap Volume (cm$^3$) |
|---|---|---|---|---|
| 1 | 1.0 | 1.0 | none | — |
| 2 | 2.0 | 2.0 | none | — |
| 3 | 2.0 | 1.0 | none | — |
| 4 | 1.0 | 0.5 | none | — |
| 5 | 1.0 | 0.3 | none | — |
| 6 | 1.0 | 0.1 | none | — |
| 7 | 1.0 | 0.1 | presence | 0.3 |
| 8 | 1.0 | 0.1 | presence | 0.5 |
| 9 | 1.0 | 0.1 | presence | 0.8 |

A description will now be given of the method of evaluating test samples 1 to 9 as the honeycomb structural body having a different structure.

First, the method used a multi-meter to detect the electrical resistance value R1 at the longest distance L1 between the electrode pair, and the electrical resistance value R2 at the shortest distance L2 between the electrode pair while a current of 1 ampere (1 A) flows between the electrodes of each of test samples 1 to 12 (see FIG. 13).

The method then detected the value of (R1−R2)/R1. Further, the method calculated the value A which is represented by the equation of A=((L1−L2)/L1)/((R1−R2)/R1). In each of test samples 1 to 12, the value of (L1−L2)/L1 was 0.22, previously described.

Figure 12:
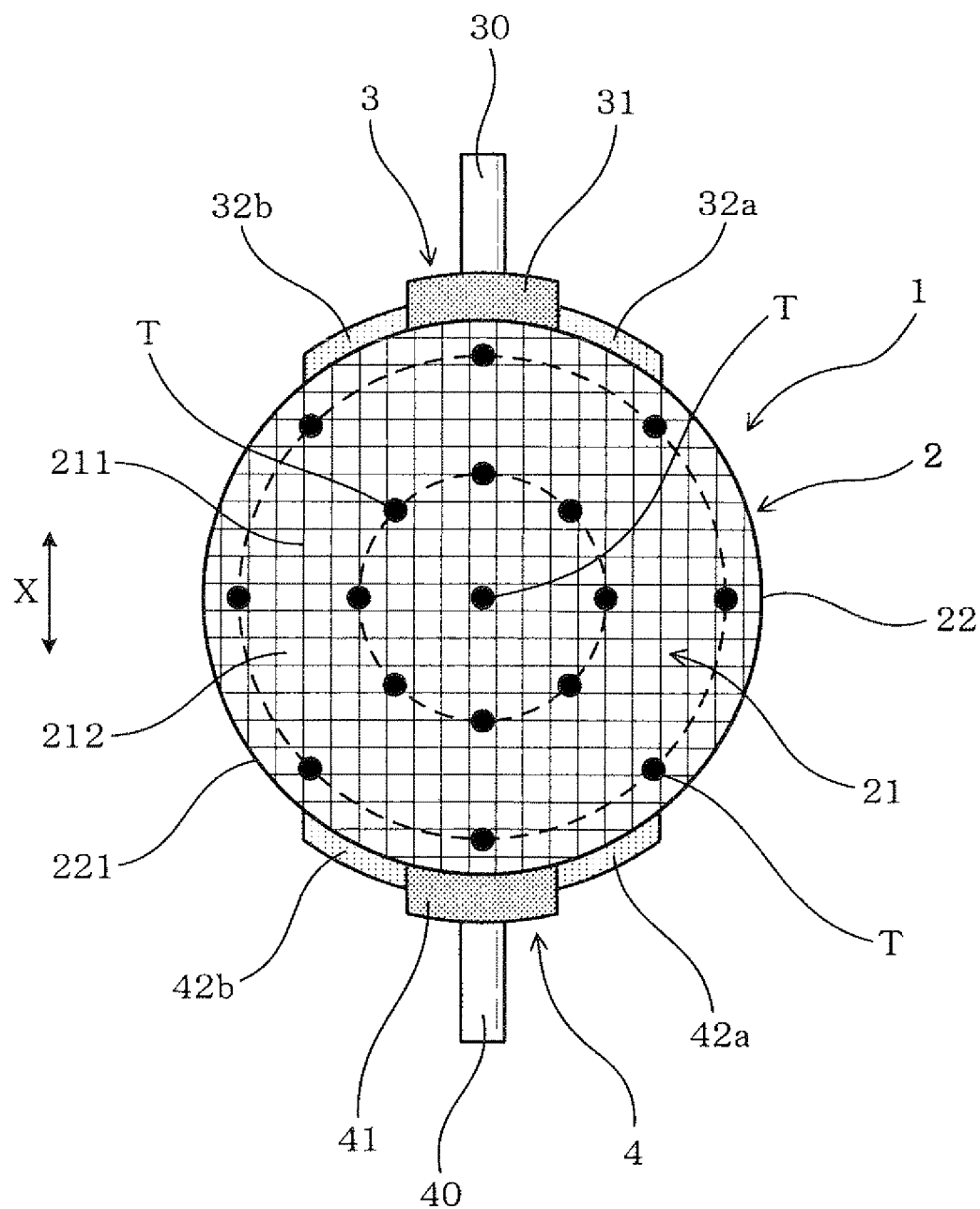
FIG. 12 is a view showing temperature detection points on a cross section of a test sample of the honeycomb body in a sixth exemplary embodiment of the present invention, the cross section is perpendicular to the axial direction of the honeycomb structural body, and, detection points at which a temperature of the honeycomb body is detected.

Next, electric power of 2 KW was supplied between the electrode pair such as the positive electrode and the negative electrode in each of test samples 1 to 9 as the honeycomb structural body. After 60 seconds, the method detected the temperature of each detection point T in each of test samples 1 to 9. FIG. 12 shows seventeen detection points T. There are various detection methods of detecting the temperature of each of the detection points T such as thermocouples, thermography, thermoviewer™, thermal imaging, and thermal video in order to detect radiation in the infrared range of test samples 1 to 9. The method according to the sixth exemplary embodiment used thermoviewer The method detected a temperature difference ΔT between the highest temperature and the lowest temperature in the seventeen detection points T in each test sample in order to evaluate whether or not the entire of test sample was heated uniformly. Table 2 shows the evaluation result.

TABLE 2

| Test sample. | Electrical resistance value R1 (Ω) | Electrical resistance value R2 (Ω) | (R1 − R2)/R1 | Value A | Temperature difference ΔT (° C.) |
|---|---|---|---|---|---|
| 1 | 12.4 | 12.2 | 0.016 | 13.6 | 225 |
| 2 | 12.3 | 12.1 | 0.013 | 17.1 | 234 |
| 3 | 12.4 | 12.1 | 0.024 | 9.1 | 188 |
| 4 | 11.5 | 11.0 | 0.046 | 4.8 | 153 |
| 5 | 11.8 | 11.0 | 0.069 | 3.2 | 120 |
| 6 | 11.7 | 9.5 | 0.189 | 1.2 | 94 |
| 7 | 12.1 | 9.5 | 0.211 | 1.0 | 77 |
| 8 | 12.0 | 9.0 | 0.254 | 0.9 | 88 |
| 9 | 11.9 | 8.8 | 0.262 | 0.8 | 94 |

As shown in Table 2, test samples 1 and 2 had the value A of 13.6 and 17.1 and a temperature difference ΔT of 225° C.

and 234° C., respectively, where each of test samples 1 and 2 had the reference electrode part and the outside electrode part having the same thickness.

On the other hand, test samples 3 to 9, in which the thickness of the reference electrode was larger than the thickness of each of the outside electrode parts, had the value A within a range of 0.1 to 10 and the temperature difference ΔT of not more than 200° C.

In particular, test samples 6 to 9 had the very superior characteristics, that is, had the value A within a range of 0.8 to 1.2 and the temperature difference ΔT of not more than 200° C.

When the value A is less than 1, the electrical resistance value of the part outside of the outside electrode part is increased, this is difficult to flow a current. This case increases the temperature difference ΔT.

As shown in Table 2, because each of test samples 7 to 9 had the gap between the outside electrode part and the surface of the honeycomb body, the value A approached the value of 1 and a temperature difference ΔT wad small or zero when compared with the value A and the temperature difference ΔT of test sample 6 having no gap.

According to the experimental results previously described, in the honeycomb structural body equipped with the honeycomb body, the thickness of each of the positive electrode and the negative electrode is adjusted, and the electrical resistance value of each electrode is controlled according to the distance between the positive electrode and the negative electrode. This makes it possible to suppress the deviation of electrical resistance value between the electrode pair by the current path through which current flows, and makes it possible for current to flow uniformly in the entire of the honeycomb body.

(Other Features of the Present Invention)

In the honeycomb body of the honeycomb structural body according to the exemplary embodiment, the cell formation part is comprised of porous partition walls and a plurality of cells. Each of the cells is surrounded by the partition walls. Each of the cells is extended along an axial direction of the honeycomb body.

When the honeycomb structural body is used in the electrically heated catalyst (EHC) device, it is possible for the partition walls of the cell formation part to support three-way catalyst such as such as platinum (Pt), palladium (Pd), rhodium (Rh), etc.

In the structure of the honeycomb structural body, the thickness of each electrode is decreased from the central part toward the outside of the electrode along the circumferential direction of the honeycomb body. It is possible to gradually decrease the thickness of each of the electrodes from the central part toward the outside thereof or to decrease stepwise the thickness of the electrode parts in each of the electrodes from the central part toward the outside thereof.

It is preferable for each of the electrodes to have a thickness within a range of 0.1mm to 5 mm. This structure makes it possible to ensure the electrodes to be formed on the outside surface of the outer skin part of the honeycomb body, and to allow the honeycomb structural body to be easily mounted to an exhaust gas pipe in an exhaust gas purifying system for an internal combustion engine such as a diesel engine and a gasoline engine.

For example, when the thickness of each of the electrodes is less than 0.1 mm, there is a possibility of it being difficult to form each of the electrodes on the outer peripheral surface of the outer skin part of the honeycomb body.

On the other hand, when the thickness of each of the electrodes is more than 5 mm, because a large diameter difference is generated between the part where the electrodes are formed and parts without any electrode, there is a possibility of it being difficult to mount the honeycomb structural body with the honeycomb body into an exhaust gas pipe of the exhaust gas purifying system for the internal combustion engine because this structure makes it difficult to support the honeycomb structural body with uniform force from the outer periphery of an exhaust gas pipe of the exhaust gas purifying system.

Accordingly, it is preferable that each of the electrodes has a uniform thickness within a range of 0.1 to 5 mm in the view of mounting it to the exhaust gas purifying system in addition to the view of easily forming the electrodes on the outer peripheral surface of the outer skin part of the honeycomb body.

The thickness of each of the electrodes is adjusted according to the distance between the electrodes which face to each other in a radial direction of the honeycomb body. An electrical resistivity "R" of electrode material can be expressed by the following equation.

$R = \rho \times (L/A)$, where R is an electrical resistance value, $\rho$ is an electrical resistivity ($\Omega \cdot cm$), L is a length (cm), and A is a cross sectional area ($cm^2$).

Accordingly, when the electrodes are made of the same electrode material, that is, when each of the electrodes has the same electrical resistivity, the more the thickness of the electrode is increased, the more the electrical resistance value per unit length of the electrode is increased along a circumferential direction which is perpendicular to the thickness direction of the electrode.

In the honeycomb structural body, each of the electrodes in the electrode pair is comprised of a reference electrode part formed at the central part on which the electrode terminal is formed. One or more outside electrode parts are formed at both ends of the reference electrode part in the circumferential direction of the honeycomb body. The reference electrode part of one electrode and the reference electrode part of the other electrode face to each other in a radial direction of the honeycomb body. The outside electrode parts of one electrode and the outside electrode parts of the other electrode face to each other in the radial direction of the honeycomb body. In each of the electrodes, the thickness of the reference electrode part is larger than that of each of the outside electrode parts.

This structure makes it possible for the temperature of the inside of the honeycomb body to be increased uniformly with high accuracy because the electrodes are divided along the circumferential direction of the honeycomb body, and the thickness of each of the divided electrode parts is adjusted in order to control the electrical resistance value of each divided electrode part.

In the honeycomb structural body, the outside electrode parts are formed at both the ends of the reference electrode part of each of the electrodes in the electrode pair in the circumferential direction of the honeycomb body, and the thickness of the outside electrode parts in each of the electrodes is decreased from the central part toward the outside of the outside electrode parts.

In this electrode structure having the plural electrode parts, the thickness of each of the electrode parts such as the reference electrode part and the outside electrode parts is decreased stepwise according to the decrease of the distance between the electrodes. In other words, the electrical resistance value of each of the electrodes is decreased stepwise. This makes it possible to suppress the deviation of electrical resistance value in the current path between the electrodes which face to each other in a radial direction of the honeycomb body. It is therefore possible for the temperature of the inside of the honeycomb body to increase uniformly as soon as electrical power is supplied to the electrodes of the honeycomb structural body.

There are various methods of adjusting the thickness of each of the divided parts such as the reference electrode part and the outside electrode parts in each of the electrodes. For example, it is possible to form the reference electrode part and the outside electrode parts by using a single electrode plate having a desired thickness or by stacking a plurality of electrode plates, where each of the electrode plates has a predetermined thickness.

In the honeycomb body, it is preferable that the electrodes formed on the surface of the honeycomb body have a value A within a range of 0.1 to 10. The value $A=((L1-L2)/L1)/((R1-R2)/R1)$, L1 is a longest distance and L2 is a shortest distance between the electrode pair in a facing direction in which the electrodes face to each other. R1 is an electrical resistance value at the longest distance L1 between the electrodes. R2 is an electrical resistance value at the shortest distance L2 between the electrodes.

This structure of the honeycomb body makes it possible to suppress the deviation from a uniform distribution of current flowing in the honeycomb body, and to flow uniform current in the honeycomb body, and for the temperature of the entire of the honeycomb body to increase uniformly.

It is preferable that each of the electrodes formed on the honeycomb body has the value A within a range of 0.8 to 1.2.

This structure makes it possible to suppress the deviation from a uniform distribution of current flowing in the inside of the honeycomb body and to flow uniform current in the inside of the honeycomb body. It is therefore possible for the temperature of the entire of the honeycomb body to increase uniformly.

A description will now be given of the value A of the honeycomb structural body having the same structure shown in FIG. 1 and FIG. 2.

That is, as shown in FIG. 13, the longest distance L1 between of the electrode pair is the distance between the central part of the reference electrode part 31 in the positive electrode 3 and the central part of the reference electrode part 41 in the negative electrode 4 in the electrode pair. On the other hand, the shortest distance L2 between of the electrode pair is the distance between the most outside part in the outside electrode part 32a (32b) in the positive electrode 3 and the most outside part in the outside electrode part 42a (42b) in the negative electrode 4.

Next, the electrical resistance value R1 at the longest distance L1 between the electrode pair is detected. Further, the electrical resistance value R2 at the shortest distance L2 between the electrode pair is detected. A current of 1 ampere (1 A) flows between the electrode terminals 30 and 40 of the electrodes 3 and 4. The test leads 81 of the multi-meter 8

The method then detected the value of (R1−R2)/R1. Further, the method calculated the value A which is represented by the equation of A ((L1−L2)/L1)/((R1−R2)/R1). In each of test samples 1 to 12, the value of (L1−L2)/L1) was 0.22, previously described.

When 1 A current flows between the electrode terminals 30 and 40 of the positive electrode 3 and the negative electrode 4, the test leads 810 of the multi-meter 800 are connected to the positive electrode 3 and the negative electrode 4 (including the reference electrode parts and the outside electrode parts shown in FIG. 13) in order to detect a voltage between the electrodes 3 and 4. The electrical resistance values R1 and R2 are calculated on the basis of the detected voltage. The contact position to which the test leads 810 of the multi-tester 800 are connected are designated by reference characters M11 and M12 when the electrical resistance value R1 is obtained, and are designated by reference characters M21 and M22 when the electrical resistance value R2 is obtained, In general, when the electrical resistivity and the sectional area are constant, the electrical resistance value is proportional to the distance between the electrodes. Basically, it is possible that the honeycomb body 2 has the constant electrical resistivity and the constant sectional area, the electrical resistance values R1 and R2 are proportional to the distance l1 and L2, respectively. When the electrical resistance values R1 and R2 are proportional to the distance l1 and L2, and the same current flows in the central part and the outside part of the electrodes 3 and 4 (as the ideal state), it is possible for the temperature of the entire of the honeycomb body 2 to increase uniformly. In the ideal state, the value $A=((L1-L2)/L1)/((R1-R2)/R1)$ takes a value of 1.

However, the current flowing in the central part of the electrodes 3 and 4 is usually different from the current flowing in the outside part of the electrodes 3 and 4. When the difference between these current values is more increased, the more the value A is different from the value of 1.

Specifically, when the current more easily flows in the outside part rather than the central part between the positive electrode 3 and the negative electrode 4, and when the electrical resistance value of each of the electrodes 3 and 4 is small, the difference between the electrical resistance values R1 and R2 is small, and the value A is more than the value of 1.

On the other hand, when the current easily flows in the central part rather than in the outside part between the positive electrode 3 and the negative electrode 4 and when the electrical resistance value of each of the electrodes 3 and 4 is large, the difference between the electrical resistance values R1 and R2 is large, and the value A is less than the value of 1.

When the thickness (namely, the electrical resistance value) of each of the electrodes 3 and 4 (containing the reference electrode parts 31, 41 and the outside electrode parts 32a, 32b, 42a and 42b) is adjusted so that the value A more approaches the value of 1, it is possible to suppress the deviation from a uniform distribution of current flowing in the inside of the honeycomb body, and for current to flow uniformly in the honeycomb body, and for the temperature of the entire of the honeycomb body to increase uniformly. Even if the honeycomb body 2 has a different size, it is possible the current in the entire of the honeycomb body to flow uniformly by adjusting the value A to be within the predetermined range of 0.8 to 1.2.

It is preferable that each of the electrodes has a gap between the reference electrode part and the outside electrode part placed adjacent to the end of the reference electrode part in the circumferential direction of the honeycomb body.

This structure makes it possible to suppress and relax mechanical stress generated when the honeycomb structural body is stored in an exhaust gas pipe of an exhaust gas purifying system and vibration and thermal stress generated when the motor vehicle drives. This makes it possible to prevent cracks from being generated in the electrodes of the honeycomb structural body.

It is acceptable to further form a gap between the outside electrode parts formed adjacent to each end of the reference electrode part in the circumferential direction of the honeycomb body. This makes it possible to further prevent cracks from being generated in the positive electrode and the negative electrode of the honeycomb structural body.

It is possible to have a structure in which a gap is formed between the outside electrode part and the honeycomb body This structure having the gap makes it possible to adjust the electrical resistance value of each of the outside electrode part. Specifically, this structure makes it possible to decrease the magnitude of current flowing in the outside electrode parts because this structure can adjust the electrical resistance value of each of the outside electrode parts. It is therefore possible to further suppress the deviation from a uniform distribution of current flowing in the inside of the honeycomb body.

For example, it is possible to use, as electrode material, ceramics containing silicon carbide SiC or SiC-Si (in which metallurgical silicon (Si) is impregnated in SiC), metal such as Cr, Fe, Ni, Mo, Mn, Si, Ti, Nb, Al or metallic alloy thereof.

Because the electrical resistivity of the electrode is very low when the above metal is used as electrode material, it is generally difficult to adjust the electrical resistivity of each of the reference electrode and the outside electrode part forming each electrode when compared with to adjust them when the above ceramics is used as the electrode material. Therefore it is preferable to use the above ceramics as the electrode material.

While specific embodiments of the present invention have been described in detail, it will be appreciated by those skilled in the art that various modifications and alternatives to those details could be developed in is light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A honeycomb structural body comprising:
   a honeycomb body comprised of a cell formation part and an outer skin part of a cylindrical shape, the outer skin part covering the cell formation part;
   a pair of electrodes formed on an outer peripheral surface of the outer skin part so that the electrodes face to each other in a diameter direction of the honeycomb body; and
   an electrode terminal formed on a central part of each of the electrodes,
   wherein, each of the electrodes comprises a reference electrode part formed at the central part on which the electrode terminal is formed and one or more outside electrode parts formed at both ends of the reference electrode part in a circumferential direction of the honeycomb body, and the reference electrode part of one of the electrodes and the reference electrode part of the other of the electrodes face each other in a radial direction of the honeycomb body, and the outside electrode parts of one electrode and the outside electrode parts of the other electrode face each other in the radial direction of the honeycomb body, and in each of the electrodes, the reference electrode part is larger in thickness than each of the outside electrode parts, and
   in each of the electrodes, gaps are formed between the reference electrode part and the outside electrode parts arranged adjacently to both sides of the reference electrode part in the circumferential direction of the honeycomb body.

2. The honeycomb structural body according to claim 1, wherein the outside electrode parts are formed at both the sides of the reference electrode part of each of the electrodes in the circumferential direction of the honeycomb body, and the thickness of the outside electrode parts in each of the electrodes is decreased from the central part toward the outside of the outside electrode parts.

3. The honeycomb structural body according to claim 1, wherein the electrodes formed on the honeycomb body have a value A within a range of 0.1 to 10, where $A = ((L1-L2)/L1)/((R1-R2)/R1)$, L1 is a longest distance and L2 is a shortest distance between the electrode pair in a facing direction in which the electrodes face to each other, R1 is an electrical resistance value at the longest distance L1 between the electrodes, and R2 is an electrical resistance value at the shortest distance L2 between the electrodes.

4. The honeycomb structural body according to claim 3, wherein each of the electrodes formed on the honeycomb body has the value A within a range of 0.8 to 1.2.

5. A honeycomb structural body comprising:
   a honeycomb body comprised of a cell formation part and an outer skin part of a cylindrical shape, the outer skin part covering the cell formation part;
   a pair of electrodes formed on an outer peripheral surface of the outer skin part so that the electrodes face to each other in a diameter direction of the honeycomb body; and
   an electrode terminal formed on a central part of each of the electrodes,
   wherein each of the electrodes comprises a reference electrode part formed at the central part on which the electrode terminal is formed and one or more outside electrode parts formed at both ends of the reference electrode part in a circumferential direction of the honeycomb body, and the reference electrode part of one of the electrodes and the reference electrode part of the other of the electrodes face each other in a radial direction of the honeycomb body, and the outside electrode parts of one electrode and the outside electrode parts of the other electrode face each other in the radial direction of the honeycomb body, and in each of the electrodes, the reference electrode part is larger in thickness than each of the outside electrode parts, and
   a gap is formed between the outside electrode part and the honeycomb body.

6. An electrically heated catalyst device comprising;
   the honeycomb structural body according to claim 1;
   catalyst supported in the honeycomb body; and
   electric power supplying means configured to supply electric power to the electrode pair.

7. An electrically heated catalyst device comprising;
   the honeycomb structural body according to claim 5;
   catalyst supported in the honeycomb body; and
   electric power supplying means configured to supply electric power to the electrode pair.

* * * * *